(12) United States Patent
Nilsen

(10) Patent No.: US 6,438,573 B1
(45) Date of Patent: Aug. 20, 2002

(54) REAL-TIME PROGRAMMING METHOD

(75) Inventor: Kelvin D. Nilsen, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 08/728,148

(22) Filed: Oct. 9, 1996

(51) Int. Cl.$^7$ .................................................. G06F 9/00
(52) U.S. Cl. ........................ 709/100; 709/102; 709/105
(58) Field of Search .................................. 709/100–107

(56) References Cited

U.S. PATENT DOCUMENTS

| | | | | |
|---|---|---|---|---|
| 5,615,327 A | * | 3/1997 | Magee et al. ............. | 395/182.1 |
| 5,630,132 A | * | 5/1997 | Allran et al. ................ | 709/100 |
| 5,706,515 A | * | 1/1998 | Connelly et al. ........... | 709/106 |
| 5,826,081 A | * | 10/1998 | Zolnowsky .................. | 709/103 |
| 5,838,968 A | * | 11/1998 | Culbert ........................ | 709/104 |
| 5,887,143 A | * | 3/1999 | Saito et al. .................. | 709/248 |

OTHER PUBLICATIONS

Scheduling Algorithm and O.S. Support for R–T Systems, Krithi Ramamritham, 8, John A. Stankovic, Jan. 1994.*
Scheduling Technique for R–T Applications Consisting of Periodic Tasks, Hardeep Singh, 1994.*
Priority Inheritance Protocol: An Approach to R–T Synchronization; Lui Sha, John P. Lehoczky, 1990.*
Dynamic Scheduling of Hard R–T Task and R–T Threads, Kearsten Shwan & Hongyi Zhou, 1992.*
Scheduling Algorithm and Operating System Support for Real–Time Systems, Krithi Ramaritham, and John A. Stankovich, Proce. of the IEEE, vol. 82, No. 1, Jan. 1994.*
Scheduling Techniques for Real–Time Applications Concicting of Periodic Task Sets, Hardeep Singh, Texas Instrument, 1994, IEEE.*
Priority Inheritance Protocols: An Approach to Real–Time Synchronization, Lui Shi, Ragunathan Rajkumar, and John P. Lehoczky, 1990 IEEE.*
Dynamic Scheduling of Hard Real–Time Tasks and Real–Time Threads, Karsten Schwan and Hongyi Zhou, 1992 IEEE.*

* cited by examiner

Primary Examiner—Majid Banankhah
(74) Attorney, Agent, or Firm—Robert E. Malm

(57) ABSTRACT

The invention is a real-time programming method (RTPM) for use in writing application programs to be executed by virtual machines and a method practiced by a real-time virtual machine (RTVM) while executing an application program written in accordance with a real-time programming method. The invention also includes a method for translating an RTPM programming language into a second programming language, the RTPM programming language being an extended version of the second programming language. The RTPM programming language includes real-time code expressions for specifying real-time execution requirements. The method of translating the real-time code expressions is such that the execution of a second-language translation of a RTPM-language application program complies with the real-time execution requirements on a best-effort basis. The RTPM utilizes a configure method and a negotiate method. The invocation of the configure method in an application program results in the quantification of the needs for one or more resources during execution of the application program by a virtual machine. The invocation of the negotiate method in an application program causes a negotiation to occur between the application program and the virtual machine concerning the allocation of one or more resources to the application program, the resources including CPU time, total memory, and memory allocation rate.

178 Claims, 11 Drawing Sheets

```
timed (30 us) {                    // throws RealTime.TimeOut
    arbitraryCode();
}
```

```
timed (30 us) {
    arbitraryCode();           // throws RealTime.TimeOut
}
```

Fig. 1

```
AlarmIdentity alarmId = new AlarmIdentity();

try {
    rtx.startTimed(30000, alarmId);
    arbitraryCode();
}
catch (ThreadDeath td) {
    // Note that the finally code below is executed before RealTime.timeout
    // is thrown to the surrounding context.
    if (rtx.alarmSet(alarmId))
        throw rtx.timeout;
    else
        // this ThreadDeath exception was intended for someone else
        throw td;
}
finally {
    rtx.clearAlarm(alarmId);
}
```

Fig. 2

```
timed (560 us) preemptible {
    liveDangerously();
}
```

Fig. 3

```
AlarmIdentity alarmId = new AlarmIdentity();

try {
    rtx.startTimedPreemptible(560000, alarmId);
    rtx.setAlarm(560000 - rtx.TimedUnwindTime, alarmId);
    arbitraryCode();
}
catch (ThreadDeath td) {
    // Note that the finally code below is executed before RealTime.timeout
    // is thrown to the surrounding context.
    if (rtx.alarmSet(alarmId))
        throw rtx.timeout;
    else
        // this ThreadDeath exception was intended for someone else
        throw td;
}
finally {
    rtx.clearAlarm(alarmId);
}
```

Fig. 4

```
timed (2 ms) aperiodic {
    doSomethingRatherBig();
}
```

Fig. 5

```
AlarmIdentity alarmId = new AlarmIdentity();

try {
   rtx.startTimedAperiodic(2000000, alarmId);
   doSomethingRatherBig();
}
catch (ThreadDeath td) {
   // Note that the finally code below is executed before RealTime.timeout
   // is thrown to the surrounding context.
   if (rtx.alarmSet(alarmId))
      throw rtx.timeout;
   else
      // this ThreadDeath exception was intended for someone else
      throw td;
}
finally {
   rtx.clearAlarm(alarmId);
}
```

Fig. 6

```
atomic {
   boundedCode();
}
```

Fig. 7

```
AtomicSegmentId asi = new AtomicSegmentId();

try {
    rtx.enterAtomic(this, asi, 0);
    boundedCode();
}
finally {
    rtx.exitAtomic(asi);
}
```

Fig. 8

```
class ActivityInventory {
    int totalActivities;
    Activity activities [];
    float importance [];
    float timeSpaceRatio [];
}
```

Fig. 9

```
class Activity {
   protected Executive rtx;

protected Task tasks [];
   protected int taskNatures [];

// The real-time executive invokes configure() when this activity is
   // added to the system workload.  Returns a representation of the
   // activity's resource needs and wants.
   protected ActivityResource configure();

// Check proposedBudget to see if it meets your requirements.  Returns
   // true if the budget is acceptable, and false if it's not acceptable.
   protected boolean negotiate(ActivityResource proposed Budget);

// Inform the activity that all budgets have been accepted and the
   // real-time executive is switching to the workload representing
   // the budget that was most recently approved by this activity's
   // negotiate() method.
   protected void commit();
}
```

Fig. 10

```
class ActivitySupervisor {
    private final int numTasks;
    private final TaskSupervisor supervisors [];
    private final int taskNatures [];

ActivitySupervisor(int taskCount, TaskSupervisor supers [], int flavors []) {
        numTasks = taskCount;
        supervisors = supers;
        taskNatures = flavors;
    }

// Additional fields and methods will be added to this class as necessary.
    // This class is for internal use only, and is not to be accessed by
    // application code.

```
class Task {
    public void startup();
    public void work();
    public void finish();
}
```

Fig. 12

```
class TaskSupervisor extends Thread {
    protected Task task;
    protected Executive rtx;
    protected long startupWCET, finishWCET;
    int nature;                             // Nature of this task
    protected long periodicAllotment;   // Periodic execution time // Additionally, I probably need some "private" data structures for use
    // by the real-time executive when it enqueues real-time tasks for
    // entry into atomic sections, etc.

abstract void run();

TaskSupervisor(Task t, Executive x, int n, long startET, long finET) {
        task = t;
        rtx = x;
        nature = n;
        startupWCET = startET;
        finishWCET= finET;
        nature = flavor;
    }

// Set the time allocation for execution of this task.  Note that the real-time
    // executive may need to revise the time budget dynamically (if, for
    // example, the system finds itself running behind schedule.)
    final void setPeriodicAllotment(long t) {
        periodicAllotment = t;
    }
}
```

Fig. 13

```
class PeriodicSupervisor extends TaskSupervisor {
    void run() { for ( ; ; ) {
            task.startup();
            try {
                timed preemptible (-this.finishWCET) {
                    task.work();
                }
            } catch (RealTime.TimeOut t) {
                // catch the exception to prevent thread from being aborted.
            } finally {
                task.finish();
            }
            rtx.relinquish();
        }
    }
}
```

Fig. 14

```
class ThreadSupervisor extends TaskSupervisor { void run() {
        task.startup();
        try {
            task.work();
        } finally {
            task.finish();
        }
    }
}
```

Fig. 15

```
class ActivityResource {
    protected int numberOfTasks;

protected int taskNatures [];

// For each task, we represent its CPU-time requirements
    protected TaskResource tasks [];

// return the real-time executive's unique identify for the specified task.
    public TaskDescirptor taskId(int taskNo) {
        return tasks[taskNo].taskIdentify;
    }

// We represent the combined dynamic memory needs of all of these
    // tasks in terms of a maximum allocation rate and a maximum amount of
    // live memory.  The live-memory bound is expressed in terms of local
    // implementation peculiarities (e.g. header and alignment overheads).
    // lengthOfTimeUnit is expressed in nanoseconds.  bytesPerUnitTime is
    // the maximum number of bytes allocated in each time unit.

// In a request: -1 means that the requestor is not sure how much memory
    // it might require.  In a granted budget: -1 means the real-time executive
    // is not able to guarantee availability of the resource.
    int minCodeBytes, expectedCodeBytes;
    int minCodeBytesPerTimeUnit, expectedCodeBytesPerTimeUnit;
    int minDataBytes, expectedDataBytes;
    int minDataBytesPerTimeUnit, expectedDataBytesPerTimeUnit;
    int minPersistentCodeBytes, expectedPersistentCodeBytes;
    int minPeristentCodeBytesPerTimeUnit,
        expectedPersistentCodeBytesPerTimeUnit;
    int minPersistentDataBytes, expectedPersistentDataBytes;
    int minPersistentDataBytesPerTimeUnit,
        expectedPersistentDAtaBytesPerTimeUnit;
    int lengthOfTimeUnit;
}
```

Fig. 16

```
class TaskResource {
    // All time values expressed in nanoseconds.

// The resource consumer expresses its requests in terms of a desired
    // execution period, a minimum acceptable execution time, and a desired
    // execution time.  For spontaneous tasks, period represents the task's
    // deadline, measured from release time.  The real-time executive
    // responds by specifying the amount of CPU time that it will normally be
    // able to provide to the task each time it is executed (expectedET),
    // and the minimum amount of time that it will provide to the task each
    // time it executes it (minET).
    protected long period;
    protected long minET, expectedET;

// Within each period, the time alloted to this task may be divided into multiple
    // time segments, each of which should be no smaller than minQuantum.
    protected long minQuantum;
```

Fig. 17a

// Time is divided into periods of execution measured from the moment the
// real-time executive begins processing the current workload. The length of
// this task's period is represented by the period field of this object. Within
// each period, the real-time executive guarantees to allow this task to run
// at least minET and usually expectedET. If maxJitter is greater than 0, this
// gives the real-time executive a certain amount of leeway in scheduling
// execution of the task: it must provide minET cpu time within each extended
// period, where an extended period is defined as the traditional period + the
// maxJitter nanoseconds before the traditional period begins + maxJitter
// nanoseconds after the traditional period ends.
protected long maxJitter;

// As part of the resource negotiation process, sporadic tasks are assigned
// task priorities and identities. These are represented by the following
// declarations. (Depending on internal implementation details, periodic,
// ongoing, and spontaneous tasks may also have assigned taskPriority
// values.
protected int taskPriority;
protected TaskDescriptor taskIdentity;
}

Fig. 17b

REAL-TIME PROGRAMMING METHOD

The U.S. Government has a paid-up license in this invention and the right in limited circumstances to require the patent owner to license others on reasonable terms as provided for by the terms of Grant No. ITA 87-02 awarded by the United States Department of Commerce.

BACKGROUND OF THE INVENTION

This invention relates generally to computer programming methods pertaining to real-time applications and more specifically to programming methods which enable the development of real-time software that can run on computer systems of different designs.

Java (a trademark of Sun Microsystems, Inc.) is an object-oriented programming language with syntax derived from C and C++. However, Java's designers chose not to pursue full compatibility with C and C++ because they preferred to eliminate from these languages what they considered to be troublesome features. In particular, Java does not support enumerated constants, pointer arithmetic, traditional functions, structures and unions, multiple inheritance, goto statements, operator overloading, and preprocessor directives. In their place, Java requires all constant identifiers, functions (methods), and structures to be encapsulated within class (object) declarations. The purpose of this requirement is to reduce conflicts in the global name space. Java provides standardized support for multiple threads (lightweight tasks) and automatic garbage collection of dynamically-allocated memory. Furthermore, Java fully specifies the behavior of every operator on every type, unlike C and C++ which leave many behaviors to be implementation dependent. These changes were designed to improve software scalability, reduce software development and maintenance costs, and to achieve full portability of Java software. Anecdotal evidence suggests that many former C and C++ programmers have welcomed these language improvements.

One distinguishing characteristics of Java is its execution model. Java programs are first translated into a fully portable standard byte code representation. The byte code is then available for execution on any Java virtual machine. A Java virtual machine is simply any software system that is capable of understanding and executing the standard Java byte code representation. Java virtual machine support is currently available for Apple Macintosh, Microsoft NT, Microsoft Windows 95, Silicon Graphics IRIX, and Sun Solaris. Ports to other environments are currently in progress. To prevent viruses from being introduced into a computer by a foreign Java byte-code program, the Java virtual machine includes a Java byte code analyzer that verifies the byte code does not contain requests that would compromise the local system. By convention, this byte code analyzer is applied to every Java program before it is executed. Byte code analysis is combined with optional run-time restrictions on access to the local file system for even greater security. Current Java implementations use interpreters to execute the byte codes but future high-performance Java systems will have the capability of translating byte codes to native machine code on the fly. In theory, this will allow Java programs to run approximately at the same speed as C++.

Within Sun, development of Java began in April of 1991. Initially, Java was intended to be an implementation language for personal digital assistants. Subsequently, the development effort was retargeted to the needs of set-top boxes, CD-ROM software, and ultimately the World-Wide Web. Most of Java's recent media attention has focused on its use as a medium for portable distribution of software over the Internet. However. both within and outside of Sun, it is well understood that Java is much more than simply a language for adding animations to Web pages. In many embedded real-time applications, for example, the Java byte codes might be represented in system ROMs or might even be pre-translated into native machine code.

Many of the more ambitious "industrial-strength" sorts of applications that Java promises to enable on the Internet have associated real-time constraints. These applications include video conferencing integrated with distributed white boards, virtual reality, voice processing, full-motion video and real-time audio for instruction and entertainment, and distributed video games. More importantly, the next generation Web client will have even more real-time requirements. Future set-top devices will connect home televisions to the Web by way of cable TV networks. Besides all of the capabilities just mentioned, these systems will also support fully interactive television applications.

Java offers important software engineering benefits over C and C++, two of the more popular languages for current implementation of embedded real-time systems. If Java could be extended in ways that would allow it to support the cost-effective creation of portable, reliable real-time applications, the benefits of this programming language would be realized by a much larger audience than just the people who are implementing real-time Web applications. All developers of embedded real-time software could benefit. Some of the near-term applications for which a real-time dialect of Java would be especially well suited include personal digital assistants, real-time digital diagnosis (medical instrumentation, automotive repair, electronics equipment), robotics, weather monitoring and forecasting, emergency and service vehicle dispatch systems, in-vehicle navigation systems, home and business security systems, military surveillance, radar and sonar analysis, air traffic control, and various telephone and Internet packet switching applications.

Java has much to offer developers of embedded real-time systems. High-level abstractions and availability of reusable software components shorten the time-to-market for innovative products. Its virtual machine execution model eliminates the need for complicated cross-compiler development systems, multiple platform version maintenance, and extensive rewriting and retesting each time the software is ported to a new host processor. It is important to recognize that the embedded computing market is quite large. Industry observers have predicted that by the year 2010, there will be ten times as many software programmers writing embedded systems applications as there will be working on software for general purpose computers.

Unlike many existing real-time systems, most of the applications for which a real-time Java is intended are highly dynamic. New real-time workloads arrive continually and must be integrated into the existing workload. This requires dynamic management of memory and on-the-fly schedulability analysis. Price and performance issues are very important, making certain traditional real-time methodologies cost prohibitive. An additional complication is that an application developer is not able to test the software in each environment in which it is expected to run. The same Java byte-code application would have to run within the same real-time constraints on a 50 MHz 486 and on a 300 MHz Digital Alpha. Furthermore, each execution environment is likely to have a different mix of competing applications with which this code must contend for CPU and memory resources. Finally, every Java byte-code program is supposed to run on every Java virtual machine, even a virtual machine that is running as one of many tasks executing on a time-sharing host. Clearly, time-shared virtual machines are not able to offer the same real-time predictability as a specially designed real-time Java virtual machine embedded within a dedicated microprocessor environment. Nevertheless, such systems are able to provide soft-real-time response.

SUMMARY OF THE INVENTION

The invention is a real-time programming method (RTPM) for use in writing application programs to be executed by virtual machines and a method practiced by a real-time virtual machine (RTVM) while executing an application program written in accordance with a real-time programming method. The invention also includes a method for translating an RTPM programming language into a second programming language, the RTPM programming language being an extended version of the second programming language. The RTPM programming language includes real-time code expressions for specifying real-time execution requirements. The method of translating the real-time code expressions is such that the execution of a second-language translation of a RTPM-language application program complies with the real-time execution requirements on a best-effort basis.

The RTPM utilizes a configure method and a negotiate method. The invocation of the configure method in an application program results in the quantification of the needs for one or more resources during execution of the application program by a virtual machine. The invocation of the negotiate method in an application program causes a negotiation to occur between the application program and the virtual machine concerning the allocation of one or more resources to the application program, the resources including CPU time, total memory, and memory allocation rate.

The RTPM utilizes control structures consisting of (1) a keyword identifying the structure, (2) a specified increment of time, and (3) a specified code segment that pertain to timed statements, preemptible timed statements, and aperiodic timed statements. For a timed-statement control structure, it is anticipated that the specified code segment will execute within the specified increment of time, execution otherwise being aborted. For a preemptible-timed-statement control structure, it is anticipated that the specified code segment will execute during a plurality of time slices within an execution period, the plurality of time slices adding up to the specified increment of time, execution otherwise being aborted. For an aperiodic-timed-statement control structure, it is anticipated that the specified code segment will execute in time segments spread over a plurality of execution periods, the time segments in the plurality of execution periods adding up to the specified increment of time, execution otherwise being aborted.

The RTPM also utilizes an atomic-statement control structure. The atomic-statement control structure consisting of (1) a keyword identifying the structure and (2) a specified code segment, the specified code segment being execution-time analyzable, the control structure requiring that either enough time be assigned to execute the specified code segment or that none be assigned.

The real-time tasks handled by the RTPM include periodic, sporadic, ongoing, and spontaneous real-time tasks, the method of execution of a real-time task comprising a startup method, a work method, and a finish method. The startup and finish methods are execution-time analyzable. The startup, work, and finish methods are invoked in sequence each time a periodic, sporadic, or spontaneous task is executed. The startup method is invoked exactly once for an ongoing task following which the work method is invoked and suspended repeatedly. The finish method for the ongoing task is invoked only when the corresponding real-time activity terminates.

The RTPM utilizes a real-time executive object to provide services in response to requests by the application code, the services being intended to provide information relating to the real-time activities.

BRIEF DESCRIPTION OF THE DRAWINGS

FIG. 1 shows a code segment that is allowed to execute no longer than 30 $\mu$s.

FIG. 2 shows the translation of the FIG. 1 code segment into code for a Java virtual machine.

FIG. 3 shows a code segment which allows a timed statement to span multiple time slices within a particular execution period.

FIG. 4 shows the translation of the FIG. 3 code segment into code for a Java virtual machine.

FIG. 5 shows a code fragment which limits the total CPU time dedicated to a particular activity but allows this CPU time to span multiple periods.

FIG. 6 shows the translation of the FIG. 5 code segment into code for a Java virtual machine.

FIG. 7 shows a code fragment which describes an atomic segment of code.

FIG. 8 shows the translation of the FIG. 7 code segment into code for a Java virtual machine.

FIG. 9 shows a code segment which declares the data structure used to request preferential treatment in the assignment of resources.

FIG. 10 shows a code segment that defines the class of real-time activities.

FIG. 11 shows a code segment that defines the class ActivitySupervisor.

FIG. 12 shows a code segment that identifies the three methods associated with each real-time task.

FIG. 13 shows a code segment that defines the class TaskSupervisor.

FIG. 14 shows a code segment that defines the class PeriodicSupervisor.

FIG. 15 shows a code segment that defines the class ThreadSupervisor.

FIG. 16 shows a code segment that defines the class ActivityResource.

FIG. 17 shows a code segment that defines the class TaskResource.

DESCRIPTION OF THE PREFERRED EMBODIMENTS

The invention is a real-time programming method (RTPM) intended to serve a spectrum of domains ranging from simple multimedia entertainment software for children to highly complex hard-real-time applications critical to the nation's defense systems. The intention is to standardize on this programming notation as a common platform for the development of shared software development tools and reusable software components. Clearly, the rigor with which particular applications need to comply with real-time constraints depends on price/performance issues and risk analyses that are different for each application. The RTPM is such that individual developers can choose to handle these tradeoffs differently.

The RTPM is a superset of virtual machine programming methods (VMPMS) exemplified by "JAVA", a programming language developed by Sun Microsystems, Inc., in that it offers additional syntax and additional time- and memory-related semantics to the VMPM programmer. However, it is a subset in that it forbids certain legal VMPM practices in cases when the use of these practices would interfere with the system's ability to support reliable compliance with real-time requirements.

RTPM programs are implemented by a special preprocessor (RTPMPP) that converts the superset dialect into VMPM code. Alternatively, RTPM programs are implemented by a compiler (RTPMC) that combines the effects of RTPMPP with the effects of a traditional Java compiler. This VMPM code is then translated to VMPM byte codes by an ordinary VMPM compiler. The resulting VMPM byte codes can be executed on a VMPM virtual machine or on a specially designed RTPM virtual machine. On a VMPM virtual machine, the translated RTPM application will make best-effort attempts to comply with the specified real-time requirements. There are a number of reasons why traditional virtual machines are unable to guarantee reliable compliance with real-time constraints. Nevertheless, for applications that are constrained by real-time expectations, executing an RTPM program on a traditional virtual machine offers important benefits over writing code in a VMPM language. In particular:

1. Application programmers are provided with standard notations in which to encode the desired real-time behavior as part of their VMPM source. This contributes to the ease of long-term software maintenance; and
2. Though the execution environment may not be able to satisfy all of the desired real-time constraints, at least the execution environment can be made aware of where it is falling short.

This information can be used by the run-time system and the application code itself to dynamically adjust service quality and load balancing.

For best performance and real-time predictability, it is necessary to run the translated byte codes on a specially designed RTPM virtual machine.

The RTPM language consists of a combination of special class libraries, standard protocols for communicating with these libraries, and the addition of two time-related control structures to the standard "JAVA" syntax. This section focuses on the syntactic changes to "JAVA". The two new control structures are known as timed and atomic statements. "Timed" identifies a segment of code whose execution must be time bounded. "Atomic" identifies a segment of code whose execution must be all or nothing. Additionally, "atomic" implies synchronized in terms of the object within which the atomic code segment appears.

These keywords are translated by the RTPM preprocessor into Java 1.0 as will be described below.

For most current applications, timing resolution of 1 microsecond is more than adequate. However, under ideal circumstances, 1 microsecond represents the execution of hundreds of machine instructions. Thus, we consider the ideal internal unit of time to be a nanosecond. Given physical constraints on implementation of computer hardware, we view it as unlikely that anyone will need to specify (or be able to implement) timing precision of less than a nanosecond. Thus, we require time spans of less than a nanosecond to be rounded up.

In Java control expressions, time is optionally labeled using the following units: h—hour; m—minute; s—second; ms—millisecond; us—microsecond; ns—nanosecond. If no unit is provided, the RTPM preprocessor assumes ns.

Note that a 32-bit signed integer is able to represent at maximum the number 2,147,483,648. If this number represents nanoseconds, then the largest time span to be represented using an integer type is 2.147 s. For this reason, the default type for representation of time is a long integer. Note that a long integer can represent 9,223,372,036,854,775,808 ns=9,223,372.036 s=153,722,867 m=2,562,047 h=106,751 days=292 years. To improve performance, we provide integer-parameterized versions of time-related methods for situations in which it is known that the time parameter's value is less than 2.147 s.

The execution model for Java assumes that Java-byte codes are validated by a byte code analyzer prior to execution. In the Java 1.0 environment, the purpose of this byte code analyzer is to ensure that the byte codes are type-consistent. Besides making sure that byte codes will not introduce type mismatch errors, the byte code analyzer for an RTPM virtual machine has the additional responsibility of determining through analysis the worst-case execution time (WCET) of particular code segments.

The large majority of code comprising an RTPM program is not intended to be execution-time analyzable. However, there are certain contexts for which reliable compliance with hard-real-time constraints requires that the maximum time required to execute particular segments be known prior to run time. Below, we provide a constructive characterization of execution-time analyzable code. But first, we provide informal source-level descriptions of what we intend to be able to analyze:

1. Straight-line code is analyzable.
2. An invocation of a final method whose implementation consists entirely of analyzable code is analyzable.
3. An if-then-else statement for which the control expression, the if-clause, and the then-clause are analyzable is analyzable.
4. A switch statement for which the selector expression and each of the case statements is analyzable is analyzable.
5. A for-loop is analyzable if each of the control expressions is analyzable and the body of the for-loop is analyzable, and the loop's iteration variable is bounded above and below by constants, and the iteration variable is incremented or decremented by a constant on each iteration, and the iteration variable is not modified within the body of the loop, break statements being allowed.
6. A timed statement with a constant time bound is analyzable, regardless of the complexity of the code that comprises its body. There is no analysis required other than determining the value of the constant time bound. Since the Java virtual machine operates at the level of Java byte codes and does not have any access to the source code from which it was translated, the formal characterization of what is analyzable must be specified in terms of Java byte code. We perform the analysis top-down, meaning that we start with a program fragment represented as a control-flow graph [A. V. Aho, R. Sethi, and J. D. Ullman,Chapter 10: Code Optimization in Compilers: Principles, Techniques, and Tools, M. A. Harrison, Editor, Addison-Wesley Publishing Company, 1986, p.796] and we determine the WCET by repeatedly finding the WCET for constituent components. Assume that each program fragment is identified as to whether it has not yet been analyzed, is currently being analyzed, has been shown to be unanalyzable, or has been shown to be analyzable. If the code is known to be analyzable, its WCET is represented by a field of the program fragment's representation. The algorithm works as follows:

1. Check the status of the program fragment. If it has already been shown to be unanalyzable, abort the analysis. If the status indicates that this fragment is currently being analyzed, mark the fragment's status as unanalyzable and abort the analysis. This would correspond to a case that involves recursive invocations of final methods. We consider such constructs to be unanalyzable.
2. Identify all method invocations within the loop. If any of the invoked methods are not final, mark this fragment's status as unanalyzable and abort the analysis. Otherwise, apply this analysis algorithm recursively to the body of each method that is invoked.
3. Identify all of the loops in the program fragment to be analyzed. We adopt the definition of loop that is provided in Aho et al.:
   a. For each node "in" the loop, there exists a path of at least length one wholly within the loop which connects this node to every other node in the loop. In other words, all of the nodes that comprise the loop are "strongly connected."
   b. There is a unique node within the loop that dominates all other nodes in the loop.

A node is said to dominate another if all paths into the loop from outside the loop must pass through this node. This unique node is identified as the loop's entry.

A straightforward method to search for all loops consists of first identifying dominator relationships with respect to the method's entry point: Node A dominates node B if every path from the method's entry point to node B must pass through node A. Then search for directed edges for which the head (destination) dominates the tail (source). The node at the head is a loop entry point.

4. For each loop found in step 3, identify a loop header and footer. The header is the same as the entry. The footer is a node that postdominates all nodes in the loop. Node A postdominates node B if every path from node B to the method's exit point must pass through node A. Since there may be multiple exits from a loop, we define the footer as follows:
   a. The footer must not be contained within the loop.
   b. If multiple nodes not contained within the loop postdominate all nodes contained within the loop, the footer is defined to be the one that dominates the others on all paths from within the loop to the method body's exit point.
   c. If there is no node satisfying the above conditions, then abort the analysis, marking this method's body as unanalyzable.
5. Analyze loops starting with the innermost nested loops and working outward. Once a loop has been analyzed, mark the loop to indicate its header, footer, and WCET. For each loop:
   a. Identify all basic induction variables. These are variables i for which all assignments within the loop are of the form i:=i±c, where c is a constant. (See Aho et al.) Our intention is to discover one or more induction variables that represent bounds on the number of times this loop may iterate.
   b. Select from the set of basic induction variables all of the variables for which a constant assignment to this variable dominates entry into the loop. Call the resulting set: constant-initiated induction variables. If this set is empty, abort the analysis, marking this method's body as unanalyzable.
   c. Select from the set of constant-initiated induction variables all of the variables that are assigned only once on each iteration of the loop. To simplify the implementation, we restrict our search to the following: (i) There is only one assignment to this variable anywhere within the loop; (ii) This single assignment is not contained within any inner-nested loops; and (iii) The node containing the single assignment dominates each of the loop's nodes that are capable of branching to the loop's header. Call the resulting set: iteration-bound induction variables. If this set is empty, abort the analysis, marking the method's body as unanalyzable.
   d. Within the loop, identify all of the decision points by which control may leave the loop. A decision point is a node in the control-flow graph which has at least two departing directed edges with at least one of these edges flowing to a node residing within the loop and at least one of the edges flowing to a node residing outside the loop.
   e. Select from the set of decision points all nodes that dominate all of the loop's nodes that are capable of branching to the loop's header. In other words, we are interested only in decision points that must be visited on each iteration of the loop. Call the resulting set: obligatory decision points. If this set is empty, abort the analysis, marking the method's body as unanalyzable.
   f. Examine each obligatory decision point to determine the condition on which the choice to leave the loop is based. Our intention is to find at least one obligatory decision point that is based on magnitude comparison of an iteration-bound induction variable with a constant. If no such decision point can be found, abort the analysis, marking the method's body as unanalyzable. If multiple such decision points are found, consider the maximum number of loop iterations to be bounded by whichever decision point represents the tightest bound. Assuming that an iteration bound can be determined, mark the loop to identify its header, footer, maximum iteration count, and ultimately, its WCET.
6. Calculate the WCET of the non-iterative loop components as the maximum WCET for any path from the component's entry point to its exit point, carefully considering pipeline and cache effects (K. D. Nilsen and B. Rygg. Worst-Case Execution Time Analysis on Modern Processors in ACM SIGPLAN 1995 Workshop on Languages, Compilers, and Tools for Real-Time Systems, 1995, San Diego, Calif.: ACM SIGPLAN).

Note that our restrictions on loops are more strict than is really necessary. Certainly, it would be possible to analytically determine WCET for more loops than satisfy our fairly restrictive criteria. Our main objective, however, is to provide reliable support for execution-time analysis of a restricted subset of the Java language, and we want to make sure that programmers can easily understand the rules (though not necessarily the implementation) that characterize this restricted subset. Note also that the following optimization is possible: characterization of a loop's iteration-bound induction variables and corresponding obligatory decision points can be performed at compile time and represented as attribute information within the byte code representation of the RTPM program.

One of the difficulties with executing general purpose Java code in a real-time environment is that the Java style of programming allows application code to clean up after itself when it is aborted. This is an important capability as it provides aborted tasks with an opportunity to release any mutual exclusion locks they might hold before the tasks are killed. A difficulty arises, however, because the real-time executive desires to control exactly when a particular task is terminated in order to prevent one task's sin (i.e. exceeding its allotted time slot) from corrupting the integrity of the entire system.

When running on traditional Java virtual machines, we consider the problem of accounting for task exception handling time to be negligible. There are so many other sources of timing uncertainty that it would not be reasonable to spend great amounts of effort addressing this concern. However, this problem needs to be addressed in order for RTPM virtual machines to reliably run hard-real-time software. The solution consists of requiring that all of the exception handlers and finally-clauses in Java source code that are executed by real-time threads be execution-time analyzable.

We provide the RTPM virtual machine with an ability to construct a call graph for each real-time thread. Using this call graph to identify all of the methods that might be invoked by the real-time thread, the byte-code analyzer identifies all of the exception handlers and finally clauses within each of these methods and analyzes their worst-case execution times. At each entry into the body of a try statement, the byte code analyzer inserts an invocation of the real-time executive's skewClock( ) method. In essence, the effect of this is to say to the real-time executive:

"Whereas you were previously requested to abort my execution at time X. I would now like you to abort me at time X–T, where T is the maximum time required to execute one of this try statement's exception handlers added to the time required to execute this try statement's finally clause."

At the end of the try statement's body, the real-time executive inserts another skewClock invocation, this time to restore the timeout clock to its original value. In the RTPM execution environment, if any of the relevant catch or finally clauses is not execution-time analyzable, the byte code analyzer rejects the code as invalid.

It is not appropriate to use Thread.Stop( ) to kill a real-time task. There are two reasons for imposing this restriction:

1. In our implementation of timed statements, we use the stop( ) method to send a ThreadDeath exception to the executing thread when the alarm time is reached. However, we have arranged to catch this exception and respond appropriately rather than allowing the exception to abort the thread. Thus, real-time threads do not respond in the "normal" way to ThreadDeath exceptions.
2. The real-time executive needs to oversee the execution of real-time tasks so it is not appropriate for other threads to kill real-time tasks directly. Rather, all requests to kill existing real-time tasks should be directed to the real-time executive by invoking its removeActivity( ) method.

Given the occasional need to interface RTPM components to modules that cannot easily be analyzed in terms of their worst-case execution times, we provide support for timed execution of code segments. The general idea is that the corresponding code is given a specified amount of time to execute. If the code completes within the specified amount of time, all is well. Otherwise, the body of the timed statement is aborted. This capability is especially useful when interacting with monitors (synchronized methods) that are outside the control of the real-time activity. Note that a timed segment may be aborted while it happens to be inside a monitor, or possibly while it is waiting for access to a monitor. Thus, it is essential to remove all locks when aborting a timed segment.

The programmer introduces a timed statement by providing the timed keyword followed immediately by the time limit enclosed within parenthesis followed by the time-constrained code represented as a compound statement enclosed within braces. For example, a code segment that is allowed to execute no longer than 30 $\mu$s is shown in FIG. 1.

The amount of time, but not the units, may be represented by an integer or long variable. It is acceptable to nest timed statements within each other. When nested, the run-time environment ensures that the timeout signal is delivered according to whichever of the nested statements has the earliest deadline (which is not necessarily the inner-most nested statement).

For the Java virtual machine implementation, the code shown in FIG. 1 is translated into the code shown in FIG. 2. In this code, rtx represents the single official instance of the real-time executive. rtx is of type RealTime.Executive. The startTimed( ) operation arranges for a timeout alarm to be delivered to this task at the appropriate time after first ensuring that there is sufficient time in the current time slice to complete execution of the timed statement's body.

The purpose of startTimed( )'s alarmid argument is to remember whether the alarm corresponding to this timed statement has been set. Note that because this code may be invoked from within the body of another timed statement, it is possible for an alarm to interrupt execution of this code even before startTimed( ) has completed its execution. If startTimed( ) executes, it modifies alarmid to so indicate. The alarmSet( ) method, executed in the ThreadDeath exception handler, returns true only if its alarmid argument had been set (that is, if this setAlarm( ) method had been executed).

The clearAlarm( ) invocation that comprises the finally clause always executes, regardless of whether the timed statement's body completed normally or was interrupted by a timeout. clearAlarm( ) has no effect if alarmid, passed as its argument, indicates that the corresponding alarm was never set. If the body of the timed statement completes normally, the purpose of the clearAlarm( ) invocation is to remove the alarm from the system, since there is no longer any need to timeout this statement's execution. If the body is interrupted because of a timeout, the purpose of the clearAlarm( ) invocation is to signal to the real-time executive that the exception handling associated with this alarm has completed. Note that, in the case of nested timed statements, it is possible that multiple levels of nesting need to be interrupted at a particular time. The real-time executive always waits for previously issued alarms to be acknowledged (by way of the clearAlarm( ) method) before issuing additional timeout exceptions.

One important use of timed segments is to prevent ongoing tasks from being suspended while they own mutually exclusive access to particular resources. If this thread represents an ongoing task and the currently remaining CPU time is less than 30,000 ns, the thread is immediately suspended. When the thread is resumed, the task once again checks timeinSlice( ) to determine whether there is sufficient time in the just-dispatched time slot to carry out the intended work. Note that an ongoing task with minimum execution time slice size smaller than one of its timed statement durations may go into an infinite loop waiting for access to the body of the statement. It is the programmer's responsibility to make sure that the real-time activity's resource negotiation does not result in situations that might lead to this sort of unproductive looping.

The standard translation of timed statements shown in FIG. 2 does not undergo any transformations when retargeting Java byte codes for an RTPM virtual machine. Nevertheless, the RTPM virtual machine provides more accurate timing of alarms. The difference results from a more tightly integrated implementation of the real-time executive and from the special byte-code transformations performed by the RTPM byte code analyzer on the exception handling provided by all try statements that are executed by real-time tasks.

The periodic execution time allotment that is offered to each task may be divided into multiple smaller time segments, known to the real-time executive as time slices. In some cases, the programmer may decide to allow a timed statement to span multiple time slices within a particular execution period. Note that this runs a risk that other real-time tasks may be blocked by this task's ownership of a Java monitor during the period of time that this task is not running.

The programmer describes this semantics by inserting the identifier preemptible following the specification of the time bound, as shown in FIG. 3. Note that preemptible is not a reserved word.

The difference between the implementation of a preemptible timed statement and an unqualified preemptible statement is that the preemptible statement checks for time remaining in the period rather than just for the time remaining in the current execution slice, as shown in FIG. 4.

As with the implementation of simple timed statements, the only difference between the Java and RTPM virtual machine implementations is the increased precision of event timing that is made possible through the RTPM byte-code analyser and a more capable real-time executive.

In ongoing threads, occasionally it is desirable to bound the execution of certain code segments without requiring that the entire time-bounded segment complete within a single execution period. In other words, the programmer desires to limit the total CPU time dedicated to a particular activity but is willing to allow this CPU time to span multiple periods. Note that this semantics is only meaningful for ongoing threads and must be used with great care if there is any possibility that the code comprising the timed statement's body includes access to synchronized segments.

The programmer describes this semantics by inserting the identifier aperiodic following the specification of the time bound, as shown in FIG. 5. Note that aperiodic is not a reserved word.

It is a programmer error to use this construct in code that is executed by periodic, sporadic, or spontaneous real-time tasks. It is possible (though not required by the RTPM) that the RTPM preprocessor perform call graph checks to make sure that this construct is used properly.

The Java virtual machine implementation of timed aperiodic statements is shown in FIG. 6. In this implementation, startTimedAperiodic( ) replaces startTimed( ).

In the RTPM virtual machine implementation, no special handling is given to this code template by the RTPM virtual machine.

An atomic segment is executed either in its entirety or not at all. In this implementation, we require only that no other atomic segments corresponding to this same object be allowed to interleave execution. Because of difficulties coordinating the real-time implementation of atomic statements with the built-in implementation of synchronized statements, we forbid the use of both kinds of synchronization within a class. The RTPM preprocessor flags as errors any use of standard Java synchronized methods or statements within an object that also makes use of atomic notations.

To describe an atomic segment of code, the programmer simply writes the code shown in FIG. 7. The body of the atomic statement, which must be execution-time analyzable, is to be executed either in its entirety or not at all. If the body of an atomic statement includes a timed statement, the body of the enclosed timed statement may not execute "all-or-nothing." Instead. it will execute as much as is possible within the specified time.

Ideally, an RTPM preprocessor would examine the body of the atomic statement to make sure it is analyzable. But this would require access to libraries that may not always be available. In particular, if the code contains invocations of any final methods, it would be necessary for the RTPM preprocessor to verify that the implementations of the final methods are themselves analyzable. Regardless of whether or not we require a certain amount of pre-run-time checking for compliance with this requirement, the most important check is the one that is performed by the byte code analyzer when this code is loaded into a particular RTPM virtual machine.

It makes no sense to statically nest atomic statements, so we forbid static nesting. However, it is possible for the bounded code of one atomic statement to invoke a method that makes use of an atomic segment in another object. Programmers should take care to avoid the possible creation of system deadlock, which might result if different threads lock multiple shared objects in different orders.

In the Java virtual machine implementation, the atomic segment is translated by the preprocessor into the code shown in FIG. 8. In this code, rtx represents the real-time executive. Object asi represents this atomic segment. If the try clause is interrupted before execution of enterAtomic( ) has completed, the exitAtomic( ) method invoked within the finally clause will detect that the atomic segment was never entered by examination of asi's internal fields. In this case, exitAtomic( ) has no effect. The third argument to enterAtomic( ) represents the maximum amount of time required to execute the body of this atomic statement. This value cannot be determined at compile time since the time required to execute this code depends on the execution environment. On RTPM virtual machines, the byte-code analyzer replaces 0 with the proper value before executing the code.

In the RTPM virtual machine implementation, the RTPM virtual machine searches for byte-code patterns that represent atomic segments. In particular, it looks for invocations of rtx.enterAtomic( ) within a try clause followed by rtx.exitAtomic( ) in the corresponding finally clause. It determines by analysis the worst-case time required to execute the body of the atomic statement followed by execution of the exitAtomic( ) operation found in the atomic statement's finally clause, and it replaces the third argument of enterAtomic( ) with this worst-case execution time value.

The RTPM adds a number of class definitions:

Activity. Application developers must structure their real-time software as RealTime.Activity objects.

ActivityInventory. This class is used to represent the real-time executive's current activity workload, with each activity accompanied by numeric descriptions of its importance and preferences regarding possible time-space tradeoffs.

ActivityResource. For purposes of resource negotiation, the resource requirements of each activity are represented by an ActivityResource object.

ActivitySupervisor. Once a mutually agreeable budget has been negotiated for a particular real-time activity, the real-time executive constructs a new ActivitySupervisor object and assigns it responsibility for enforcing the activity's budgets.

AlarmIdentity. This class is used to remember all of the information associated with a particular alarm. Its standard constructor creates an object that is tagged as uninitialized. After the alarm corresponding to this object has been set, this object's tag is changed to represent the alarm.

AtomicSegmentId. This class is used to remember all of the information associated with a particular atomic segment. Its standard constructor creates an object that is tagged as uninitialized. After the atomic segment corresponding to this object has been entered, this object's tag is changed to represent the atomic segment with enough information to allow mutually exclusive access to the corresponding object to be properly relinquished when it is time to depart from the atomic segment.

Executive. This class represents the real-time executive. Under normal circumstances, there is only one instance of this object in a Java virtual machine's execution environment.

FrequencyExcess. This extends Exception. This exception is thrown by the real-time executive's triggerTask( ) method whenever an attempt is made to invoke a sporadic task more frequently than was arranged at resource negotiation time.

ReferenceNotPersistent. This extends Exception. This exception is thrown whenever an application attempts to commit to stable storage an object that contains references to other objects not already located in stable storage. Note that it is not meaningful for persistent objects to refer to nonpersistent objects. If it were necessary to restore the system from persistent memory, fields that had contained references to nonpersistent objects would not be meaningful. For this reason, the implementation of PersistencyManager forbids such references.

Persistent. This is an interface that represents the notion that certain objects may be stored in persistent memory.

PersistencyManager. There are no instances of this object. Instead, all of the functionality of the persistency manager is implemented by static methods.

Task. Application developers must structure each real-time task as an instance of this class.

TaskDescriptor. Each of the real-time tasks that is currently active is represented by a TaskDescriptor object.

TaskNotReady. If application code attempts to trigger execution of a sporadic task that has not yet been properly initialized (e.g. a task that is really not sporadic or one that belongs to an activity that is no longer running or one that equals null), triggerTask( ) throws this exception.

TaskResource. For purposes of resource negotiation, the resource requirements of each task of a real-time activity are represented by a TaskResource object.

TaskSupervisor. This extends Thread. Each real-time task is managed by a TaskSupervisor object. There are three subclasses: PeriodicSupervisor, SpontaneousSupervisor, ThreadSupervisor.

TimeOut. This extends Exception. This exception is thrown by RTPM preprocessor-generated code when a timed segment exceeds its specified time limit.

In the descriptions of real-time executive services that are described below, there are several services that need to identify particular methods by string name. These include analyze( ), interpret( ), and translate( ). The convention we adopt for naming methods consists of the following:

1. The complete package name, followed by
2. The class name, followed by
3. A single colon, followed by
4. The method's ResultType, followed by
5. The method's MethodDeclarator.

The ResultType and MethodDeclarator are described according to the syntax provided in The Java™ Language Specification, Version 1.0, 1995.

The material that follows describes services provided to application code by the RealTime.Executive object. We have subdivided the material according to category of service. The routines described below are intended to facilitate self-analysis of execution times and memory requirements. In general, we encourage performance measurement to determine average-case execution times and static analysis to determine expected and worst-case execution times. Static analysis is only appropriate for relatively simple code segments. Traditional Java virtual machines are unable to perform static analysis of code.

We have considered the possible benefits of providing a service that allows applications to flush data and instruction caches so as to ensure that particular execution times are measured in the worst possible execution environments. However, we decided against this option because use of this facility would negatively impact the execution of currently running tasks. If it is really necessary to obtain worst-case execution times, these should be obtained through static analysis rather than measurement.

long analyze WCET(String methodName)
  Given that methodName uniquely identifies a particular analyzable method, return the worst-case time required to execute this method, in nanoseconds. If the real-time executive determines that the method's code is not analyzable, analyze( ) returns 0. If the virtual machine simply lacks the ability to analyze code, analyze( ) returns −1.

long analyzeEET(String methodName)
  Given that methodName uniquely identifies a particular analyzable method, return the expected time required to execute this method, in nanoseconds. If the real-time executive determines that the method's code is not analyzable, analyze( ) returns 0. If the virtual machine simply lacks the ability to analyze code, analyze( ) returns −1.

int codeSize(Object o)
  Returns the worst-case number of bytes required to represent the object o's instruction and static memory, including byte codes, translated machine code, and placeholders for static variables. Note that certain objects may require variable amounts of memory, depending on alignment and packing opportunities. Returns −1 if this information is not available (A stock Java virtual machine may not be able to determine this information).

int dataSize(Object o)
  Returns the worst-case number of bytes required to represent the data belonging to object o, including alignment padding and header overhead. Note that certain objects may require variable amounts of memory, depending on alignment and packing opportunities. Returns −1 if this information is not available (A stock Java virtual machine may not be able to determine this information).

void interpret(String methodName)

Given that methodName uniquely identifies a particular method, hint to the underlying runtime system that this method should not be translated to native code but should instead be interpreted each time it is executed. This is only a suggestion. It is the run-time environment's choice whether to honor the request. If the same method is to be analyzed to determine its execution time, it is important to invoke interpret( ) before invoking analyzeWCET( ) or analyzeEET( ).

int persistentCodeSize(Persistent o)

Returns the worst-case number of bytes of non-volatile memory required to represent the object o's instruction and static memory, including byte codes, translated machine code, and placeholders for static variables. Returns −1 if this information is not available (A stock Java virtual machine may not be able to determine this information).

int persistentDataSize(Persistent o)

Returns the worst-case number of bytes of non-volatile memory required to represent the data belonging to object o, including alignment padding and header overhead. Note that certain objects may require variable amounts of memory, depending on alignment and packing opportunities. Returns −1 if this information is not available (A stock Java virtual machine may not be able to determine this information).

Object [ ] references(Object o)

Returns an array of objects representing all of the memory directly referenced by object o. This routine is useful for traversing all of the data structures rooted at a particular live object for purposes of determining how much memory is required to represent the object and its descendants.

void translate(String methodName)

Given that methodName uniquely identifies a particular method, hint to the underlying run-time system that this method should be translated to native code rather than interpreted each time it is executed. This is only a suggestion. It is the run-time environment's choice whether to honor the request. If the same method is to be analyzed to determine execution time, it is important to invoke translate( ) before invoking analyzeWCET( ) or analyzeEET( ).

The time facilities supported by Java 1.0 are too coarse to be of use to developers of real-time applications. They represent "Coordinated Universal Time" (UTC) with precision no finer than one millisecond. Many real-time processes require finer grain timing resolution.

Note that an accumulation of round-off errors might result in considerable inaccuracy of time quantities, especially on non-real-time Java virtual machines. For this reason, we require that the real-time executive consistently round its accumulation of time up. This guarantees that any execution time approximations based on cpuTime( ) measurements are conservative.

long cpuTime( )

Reports the amount of CPU time that has been executed by the current thread in nanoseconds. The difference between the values returned by two distinct cpuTime( ) invocations represents an upper bound on the amount of CPU time spent by this process between the two probe points. cpuTime( ) must be invoked from within a real-time task.

void sleep(long nano)
void sleep(int nano)

Put the currently executing thread to sleep for nano ns. Note that this routine provides functionality similar to Thread.sleep( ) but with greater timing precision. sleep( ) must be invoked from within a real-time task.

int timeAccuracy( )

Returns the resolution of the local time measuring device in nanoseconds. The returned value represents the smallest number of nanoseconds that can be distinguished on this system. The value returned by timeAccuracy( ) represents the minimum available accuracy used by cpuTime( ) and upTime( ) measurements.

long upTime( )

Returns the number of nanoseconds since system startup. This is the absolute time by which real-time activities measure their relative progress.

The following routines are used primarily for negotiation of CPU time and memory resources.

boolean addActivity(Activity a)

Call this whenever it is necessary to add new real-time activities to an existing workload. This routine automatically invokes the configure( ) method for the new activity and then calls negotiate( ) for this and other currently executing activities in order to arrange a mutually agreeable allocation of resources. addActivity( ) returns true if it managed to successfully add the specified activity to the current workload, or false if the new activity had to be rejected.

boolean addBiasedActivity(Activity a, float importance, float timeSpaceRatio)

Call this whenever it is necessary to add a new real-time activity to an existing workload with special bias given to this activity. This routine automatically invokes the configure( ) method for the new activity and then calls negotiate( ) for this and other currently executing activities in order to arrange a mutually agreeable allocation of resources. addBiasedActivity( ) returns true if it managed to successfully add the specified activity to the current workload, or false if the new activity had to be rejected.

void removeActivity(Activity a)

Call this when an existing real-time activity must be removed from the current workload. Invoking removeActivity( ) may result in renegotiation of system resources, at the real-time executive's discretion.

void renegotiate(Activity a, ActivityResource p)

Modify the resource request of real-time activity a as specified by p. This may result in renegotiation of system resources at the real-time executive's discretion.

boolean scheduleSpontaneous(Activity a, ActivityResource r, long maxReleaseTime)
boolean scheduleSpontaneous(Activity a, ActivityResource r, int maxReleaseTime)

Given that a represents a collection of spontaneous tasks and r represents their collective resource requirements, schedule all of these tasks for one-time execution with release sometime between now and maxReleaseTime and individual task deadlines as described by argument r. By design, scheduleSpontaneous( ) does not trigger system-wide renegotiation for resources. The spontaneous workload is only accepted into the system if it can be handled without negatively impacting the current workload. scheduleSpontaneous( ) returns true if the activity was effectively scheduled and false otherwise.

An atomic segment is executed either in its entirety or not at all. On traditional Java virtual machines, this requires simply that once the atomic segment begins to execute, the corresponding thread cannot be suspended or aborted until after the atomic segment has completed execution. Under ideal conditions, we do not allow control to enter into an atomic segment unless we are assured that there is sufficient time remaining in the current time slot to complete execution of the atomic code within this time slot. An additional constraint imposed by the atomic qualifier is that only one thread at a time may be executing code identified as atomic within a particular object's methods. This constraint is redundant with the first on single-processor virtual machines. However, on multi-processor systems, this constraint must be enforced dynamically.

void enterAtomic(Object o, AtomicSegmentId asi, int executionTime)

void enterAtomic(Object o, AtomicSegmentId asi, long executionTime)

Given that the currently executing thread is a supervisor for a real-time task, perform the following:

1. If this is a multiprocessor system, check to make sure that no other task is currently locking access to object o. If the object is locked, place this task on a wait queue associated with the object's lock. Remain on the wait queue until access is granted or until this task's current time slice expires, whichever comes first. If the time slice expires first, suspend this task and restart enterAtomic( ) when and if the task is resumed. The meaning of suspend depends on circumstances:
    a. If this task is an ongoing task, it is simply put to sleep until its next scheduled execution time slot. When the task is resumed, the checks are performed again.
    b. If this task is a periodic, sporadic, or spontaneous task and it is scheduled to receive additional time slices within its current period, put the task to sleep until its next scheduled time slice. When the task is resumed, the checks are performed again.
    c. If this task is a periodic, sporadic, or spontaneous task and it is not scheduled to receive additional time slices within its current period, the real-time executive aborts execution of work( ) and invokes the task's finish( ) method.
2. Make sure that there is sufficient time in the current time slice to execute the complete atomic statement. In essence, the real-time executive checks to see if the currently executing time slice has at least executionTime ns remaining. If this condition cannot be satisfied at the current time, suspend the task. (See above for a description of suspend.)
3. Set the value of asi to represent this atomic segment. If this is a multiprocessor system, set appropriate flags within the real-time executive to prohibit other tasks from executing atomic statements that belong to this same object.

Note that on single-processor systems, atomicity is enforced simply by ensuring that the task will not be preempted during execution of its atomic statement. However, on multiprocessor systems, it is necessary to ensure that tasks running on other processors are not concurrently executing atomic code associated with this same object. In general, atomic statements are very short. and we expect mutual exclusion conflicts to be extremely rare. Nevertheless, there is a possibility in a multiprocessor system that tasks running on certain processors "conspire" to starve tasks running on other processors. For this reason, we recommend that the implementation of wait queues associated with each object's atomicity lock be arranged such that information characterizing the time at which a particular request to enter the atomic segment was first issued be stored within the asi argument to enterAtomic( ). Access to the atomic segment is granted in order of time of initial access request, even though particular tasks may have temporarily withdrawn their requests and then resubmitted them at a later time.

void exitAtomic(AtomicSegmentId asi)

Given that the currently executing thread is a supervisor for a real-time task, take note that this thread is now leaving the atomic region identified by asi. Furthermore, release the mutual exclusion constraint on the object o that is identified by asi, thereby permitting other tasks access to o's atomic segments. If asi indicates that this atomic segment was not entered (because, for example, the task was aborted before it had a chance to get in), then the handling provided by this method is different than if the atomic segment had actually been entered. As a side effect of exitAtomic( ), asi is restored to its uninitialized state, thereby enabling its reuse in case the atomic segment is executed within a loop.

Note that there exist subtle interactions between the implementation of atomic and timed statements. In particular. an atomic statement executing within a timed statement should not be interrupted by expiration of the surrounding context's timeout alarm. However, a timed statement executing within an atomic segment does need to be interrupted at the appropriate alarm time. The real-time executive implements the.following semantics for alarms:

1. If the alarm was set after entering into the current atomic segment, the alarm is raised at the appropriate time. This corresponds to nesting of a timed statement within an atomic statement.
2. If the alarm was set before entering into the current atomic segment and the alarm time arrives while the application is still executing the body of the atomic segment, delivery of the alarm's exception is postponed until after the application leaves its atomic statement. This corresponds to nesting of an atomic statement within a timed statement.

The RTPM provides a mechanism called a "timed statement" for time-bounded execution of code that is not necessarily analyzable. This material that follows discusses the real-time executive services that are used in the implementation of this mechanism. Note that these routines are available to application programmers for their use in implementing their own scheduling strategies within the real-time disciplines imposed by the RTPM execution model.

boolean alarmSet(AlarmId a)

Returns true if and only if the alarm represented by argument a has been set (i.e. initialized). Otherwise, returns false.

void clearAlarm(AlarmId a)

Remove the specified alarm (a) from the timeout queue if the corresponding alarm is set. (Note that a may indicate that this alarm was never set.) We require that alarms be removed in LIFO order. In other words, the most recently set alarm that is still pending is the next one to be removed. As a side effect of executing this method, object a is restored to its "uninitialized" state.

This allows the same object a to be reused if, for example, a timed statement occurs inside of a loop.

private void relinquish( )

Given that the currently executing thread is a supervisor for a periodic real-time task, suspend the supervisor until the next time that it is appropriate to trigger its execution. When this time arrives, simply resume execution of the thread. relinquish( ) is not to be executed directly by application code. Rather, it is invoked by the TaskSupervisor object that oversees execution of the application code.

void skewClock(long nsec)

Adjust pending alarm times by nsec ns. Suppose that prior to invocation of skewClock( ), an interrupt was scheduled to arrive at time D. Following execution of skewClock( ), that interrupt will be delivered at time D−nsec. Note that the effects of executing this routine only impact timeouts. skewClock( ) does not affect the system's notion of absolute time. Also note that skewClock( ) is never invoked on traditional Java machines because, according to the standard RTPM protocols, invocations of skewClock( ) are only inserted into the Java byte code stream by the special byte code analyzer that is part of the RTPM virtual machine.

void startTimed(int timeLimit, Alarmidentity alarmid)
void startTimed(long timeLimit, Alarmidentity alarmid)

Prepare for execution of a timed statement of duration specified by timeLimit. If timeLimit is negative, it represents a request to set the alarm to expire at −timeLimit ns before the end of the current time slice. As a side effect, set the contents of alarmid to represent the alarm that has been set to expire at the appropriate time. The work performed by startTimed( ) consists of the following:

1. Make sure that there is sufficient time in the current time slice to execute the complete timed statement. In essence, the real-time executive checks to see if the currently executing time slice has at least timeLimit ns remaining.
2. If condition 1 cannot be satisfied, the thread is suspended. The meaning of suspend depends on circumstances:
    a. If this task is an ongoing task, it is simply put to sleep until its next scheduled execution time slot. When the task is resumed, the checks are performed again.
    b. If this task is a periodic, sporadic, or spontaneous task and it is scheduled to receive additional time slices within its current period, put the task to sleep until its next scheduled time slice. When the task is resumed, the checks are performed again.
    c. If this task is a periodic, sporadic, or spontaneous task and it is not scheduled to receive additional time slices within its current period, the real-time executive aborts execution of work( ) and invokes the task's finish( ) method.
3. After the above requirements have been satisfied, the real-time executive sets an alarm which is scheduled to expire timeLimit—B CPU-time ns from now, where B represents the worst-case time required by the task's exception handlers to respond to the timeout exception added to the maximum time spent within the implementation of startTimed( ) between the time at which condition 1 is satisfied and the time at which the alarm is set. At the same time the alarm is set, the alarmID object is updated to reflect the identity of the set alarm. Setting of the alarm and updating of alarmid are done together. Either both or neither is performed. When the alarm time arrives, the real-time executive sends a ThreadDeath exception to this task.

void startTimedPreemptible(int timeLimit, Alarmidentity alarmid)
void startTimedPreemptible(long timeLimit, Alarmidentity alarmid)

Prepare for execution of a timed preemptible statement of duration specified by timeLimit. If timeLimit is negative, it represents a request to set the alarm to expire at −timeLimit ns before the end of the current period. As a side effect, set the contents of alarmid to represent the alarm that has been set to expire at the appropriate time. The work performed by startTimedPreemptible( ) consists of the following:

1. Make sure that there is sufficient time in the current period (consisting possibly of multiple scheduled time slices) to execute the complete timed statement. In essence, the real-time executive checks to see if the currently executing period has a remaining CPU-time allotment of at least timeLimit ns.
2. If condition 1 cannot be satisfied, the thread is suspended. The meaning of suspend depends on circumstances:
    a. If this task is an ongoing task, it is simply put to sleep until its next scheduled execution time slot. When the task is resumed, the checks are performed again.
    b. If this task is a periodic, sporadic, or spontaneous task, the real-time executive aborts execution of work( ) and invokes the task's finish( ) method.
3. After the above requirements have been satisfied, the real-time executive sets an alarm which is scheduled to expire timeLimit—B CPU-time ns from now, where B represents the worst-case time required by the task's exception handlers to respond to the timeout exception added to the maximum time spent within the implementation of startTimedPreemptible( ) between the time at which condition 1 is satisfied and the time at which the alarm is set. At the same time the alarm is set, the alarmid object is updated to reflect the identity of the set alarm. Setting of the alarm and updating of alarmid are done together. Either both or neither is performed. When the alarm time arrives, the real-time executive sends a ThreadDeath exception to this task.

void startTimedAperiodic(int timeLimit, Alarmidentity alarmid)
void startTimedAperiodic(long timeLimit, Alarmidentity alarmid)

Prepare for execution of a timed aperiodic statement of duration specified by timeLimit. As a side effect, set the contents of alarmid to represent the alarm that has been set to expire at the appropriate time. The work performed by startTimedAperiodic( ) consists of the following:

1. Make sure that the currently executing task is an ongoing task. If it is not, simply abort execution of work( ) and invoke the task's finish( ) method.
2. Set an alarm which is scheduled to expire timeLimit—B CPU-time ns from now, where B represents the worst-case time required by the task's exception handlers to respond to the timeout exception added to the maximum time spent within the implementation of startTimed( ) between the time at which condition 1 is satisfied and the time at which the alarm is set. At the same time the alarm is set, the alarmid object is updated to reflect the identity of the set alarm. Setting of the alarm and updating of alarmid are done together. Either both or neither is performed. When the alarm time arrives, the real-time executive sends a ThreadDeath exception to this task.

Budgets for each activity's allocation of volatile and non-volatile memory are enforced by the real-time executive. The real-time activity can enquire regarding its current budget status using the following two methods:

int allocatableBytes( )

Returns the number of bytes of volatile memory that the currently executing activity has permission to allocate. Assuming that the real-time executive is able to track the memory usage of individual activities, each activity's budget is increased as memory is reclaimed by the garbage collector and is decreased as the tasks that comprise the activity allocate memory. If the real-time executive is not able to track the memory usage of activities (traditional Java virtual machine implementations of the real-time executive probably cannot), allocatableBytes( ) returns −1.

int allocatablePersistentBytes( )

Returns the number of bytes of non-volatile memory that the currently executing activity has permission to allocate. Assuming that the real-time executive is able to track the memory usage of individual activities, each activity's budget is increased as persistent memory is reclaimed by the garbage collector and is decreased as the tasks that comprise the activity allocate persistent memory. If the real-time executive is not able to track the persistent memory usage of activities, allocatablePersistentBytes( ) returns −1.

void doGC(int memSize, int persistentSize)

Invoking this method causes the real-time executive to perform garbage collection during what was to have been this task's CPU-time slice until there is enough allocatable memory for the given activity to allow a single object of memSize bytes or a single persistent object of persistentSize bytes to be allocated. If the time slice expires before the requested memory has been obtained, the task is simply suspended until its next scheduled execution.

void enableMemAllocExceptions( )

By invoking this method, a task informs the real-time executive that it prefers to receive an OutOfMemoryError exception whenever one of its memory allocation requests cannot immediately be satisfied.

int largestAllocatable( )

Returns the size of the largest contiguous block of memory that may be allocated by this task at the current time. We allow an imprecise implementation of this routine for the sake of memory management efficiency. (It may be possible to allocate a larger object than the size returned from largestAllocatable( ).)

int largestPersistentAllocatable( )

Returns the size of the largest contiguous block of persistent memory that may be allocated by this task at the current time. We allow an imprecise implementation of this routine for the sake of memory management efficiency. (It may be possible to allocate a larger object than the size returned from largestPersistentAllocatable( ).)

void suppressMemAllocExceptions( )

By invoking this method, a task informs the real-time executive that it desires to automatically relinquish its scheduled execution time to the garbage collector whenever one of its allocation requests cannot be satisfied. This is the default configuration for all real-time tasks. The garbage collector is allowed to execute until such time as this task's time slot expires or until the garbage collector reclaims the memory required to satisfy the allocation request, whichever comes first. Note that garbage collection is a global process. The real-time executive takes responsibility for ensuring that enough global CPU time is spent performing garbage collection to reliably satisfy whatever allocation rates were guaranteed during resource negotiations. Time spent by this "task" in performing garbage collection does not necessarily reclaim the memory required by the currently executing activity. This effort may do more to reclaim memory belonging to other activities. Nevertheless, since this activity is unable to proceed without additional memory, it might as well provide service of general "community" benefit.

If a real-time activity desires to partition memory between its independent tasks, the application programmer must take responsibility for performing all of the bookkeeping required to implement the desired partitioning.

The main ongoing responsibility of the real-time executive is to dispatch real-time tasks according to agreed-upon real-time schedules. For periodic, sporadic, and spontaneous tasks, the real-time scheduler waits for a relinquish( ) invocation to terminate the tasks' time slot. For ongoing tasks, the real-time executive automatically suspends the task at the end of its allotted time slot after first waiting for ongoing execution of any atomic segments to be completed.

The following routine is used to trigger execution of sporadic tasks:

void triggerTask(TaskDescriptor taskid) throws FrequencyExcess,TaskNotReady

Given that taskid represents the task to be executed, invoking triggerTask( ) causes the task to be released for execution at whatever priority was determined appropriate at resource negotiation time. Before releasing the task for execution, triggerTask( ) first verifies that the specified task has not yet exceeded its previously negotiated execution frequency. If the task has already used up its execution frequency budget, triggerTask( ) throws a FrequencyExcess exception rather than executing the task yet another time. If taskid equals null or represents a task that is not sporadic or belongs to an activity that is no longer running, triggerTask( ) throws a TaskNotReady exception.

When negotiating for resources to be allocated to individual real-time activities, the real-time executive's default behavior is to treat each activity's requests with equal priority. However, there are circumstances in which overall service quality would be better served by treating certain activities as more important than others. The real-time executive provides a number of mechanisms whereby applications can request of the real-time executive that it give preferential treatment to particular needs. The sorts of preferential treatment that might occasionally be necessary include:

1. An ability to bias tradeoffs between CPU time and memory availability: The amount of memory available to application processes is related to the amount of time spent in garbage collection. However, time spent by the garbage collector is not available for execution of application code.

2. An ability to bias memory budgets: If sufficient resources exist to provide each activity with a guaranteed budget for all of the memory that it requested, there is no need to prioritize memory allocation. However, in cases when memory requests exceed capacity, then it might be desirable to specify that certain activities are given more than an "equal" share of whatever otherwise uncommitted memory might be available.

3. An ability to bias CPU-time budgets: If sufficient resources exist to provide each activity with a guaranteed budget for all of the CPU time that it requested, there is no need to prioritize CPU-time allocation. However, in cases when CPU-time requests exceed capacity, then it might be desirable to specify that certain activities are given more than an "equal" share of whatever otherwise uncommitted CPU time might be available.

4. An ability to adjust the periods of activity tasks: In many cases, the physical constraints that govern real-time behavior offer considerable flexibility in selection of the frequencies at which particular real-time tasks must be executed. In these cases, the resource negotiator may choose to adjust task periods so that they align more evenly with the current period of the system's real-time cyclic schedule.

The material that follows discusses possible ways to enhance perceived service quality and responsiveness. It is not required that implementations of the real-time executive respond to bias requests. Furthermore, there is considerable flexibility in how a particular real-time executive responds to these requests. Here, we describe only one possible approach.

As part of resource negotiation, the real-time executive creates resource budgets for all of the current real-time activities. Its standard algorithm is to first set aside resources (CPU-time, volatile memory, and non-volatile memory) to meet the minimal requirements of each activity and then to divide whatever resources remain between the real-time activities according to the strategy discussed immediately below.

By default, each activity is given equal treatment. Individual tasks are assigned CPU time in proportion to the size of their requests. For example, if the combined CPU-time requests sum to 550 ms/s, but there is only 230 ms/s of allocatable CPU time, the granted CPU-time budget for each task is 230/550=41.8% of the task's requested CPU time. Memory budgets are calculated similarly.

Preferential treatment can be requested for certain activities by modifying the corresponding importance entry in the data structure shown in FIG. 9. Within ActivityInventory, each of the arrays has one entry for each of the currently active real-time activities. Suppose the system's current workload is represented by variable workload of type ActivityInventory. To give the third activity twice as much importance as the first, assign:

workload.importance[2]=2.0;

Note that arrays use 0-based subscripting, so subscript 2 selects the third entry in the array. Now, when computing resource budgets, the third activity will get twice as much resource as the others, up to the limit specified as the amount requested by this activity. The algorithm works as follows:

1. Sum all of the resource requests, counting the third activity's requests twice.
2. Divide the total request by the total amount of resource that is available to determine the scaling factor by which requests are converted into budgets, as suggested by the example discussed above.
3. Assign budgets to individual activities in descending order of activity importance. Grant to each activity its request multiplied by its importance times the allocation scaling factor computed in step 2. However, if this budget exceeds the activity's request, truncate the budget to equal the request; then adjust the scaling factor appropriately to account for the excess resource availability and the remaining activity resource requests.

Each activity may independently specify whether it values time or memory more dearly. The timeSpaceRatio field represents this tradeoff. A value of 1.0 indicates that if this activity cannot be granted all of the CPU time and memory that it requests, it would like the two requests to be scaled back in the same proportions to whatever degree is necessary in order to execute reliably. A value of 0.5 indicates that the activity considers memory to be twice as valuable as CPU-time. In other words, if it is necessary to scale the resource requests, do it in such a way that for every 1% decrease in the memory budget, the CPU-time budget is decreased by 2%.

The resource allocation described above represents an oversimplification. This paragraph provides a more complete description of the entire process. Missing from the above description is all consideration of the problem that before we can determine how much CPU-time and how much memory is available to be allocated, we must decide how much of the CPU's efforts will be dedicated to garbage collection responsibilities. The recommended analysis follows:

1. Add up the total minimum requests for memory and CPU time. If this cannot be satisfied, simply reject the proposed workload.
2. Add up the total desired requests for memory and CPU time. If both of these can be satisfied, compute appropriate budgets and we're done.
3. Compute a system-wide timeSpaceRatio as a weighted average of individual timeSpaceRatio values, using each activity's importance as the weight of its timeSpaceRatio.
4. Use the system-wide timeSpaceRatio to select how much CPU time will be set aside for real-time garbage collection. This choice determines how much CPU time and how much memory is available for allocation to each activity.
5. Allocate CPU time to individual activities according to their importance, using the resource allocation technique outlined above.
6. Allocate memory to individual activities according to their importance, using the resource allocation technique outlined above.

Note that the real-time executive does not consult activity timeSpaceRatio values when it is performing steps 5 and 6. These values are only used to determine the system-wide ratio of garbage collection to application processing. Recognize that the algorithms described here are not necessarily optimal. These are simply heuristics, and the real-time executive may choose to respond to bias requests using different algorithms or may choose to ignore the requests entirely.

In order to support the capabilities described in this section, the real-time executive implements the following methods:

Activityinventory getBiases( )
  Returns an ActivityInventory object that represents all of the activities in the current workload along with the importance and timeSpaceRatio of each.

void biasWorkload(ActivityInventory newBias)

Update the system workload according to newBias, overwriting the importance and timeSpaceRatio entries for each of the activities that is in both the current workload and in newBias. The typical sequence of events is for application code to first invoke getBiases( ), to subsequently modify the value returned from getBiases( ), and then to submit the modified biases back into the real-time executive by invoking biasWorkload( ). Note that it is possible for certain activities to have been removed from or added to the system workload between the invocations of getBiases( ) and biasWorkload( ). For this reason, biasWorkload( ) only modifies the subset of activities that exist both in the current workload and within its newBias argument.

long systemCycleTime( )

Returns the number of nanoseconds required to execute one period of the system's cyclic schedule. This is generally the least-common multiple of the system's currently active periodic and ongoing task periods. systemCycleTime( ) returns 0 if the system is not currently using a cyclic dispatch table.

The following are static objects, declared and initialized in the RealTime.Executive object:

public final static int OngoingTask

A defined constant used to represent ongoing tasks wherever the nature of a task must be distinguished by a single integer value.

public final static TimeOut timeout

Code that needs to throw timeout exceptions can simply throw this object to avoid needing to allocate a TimeOut object on the fly.

public final static int PeriodicTask

A defined constant used to represent periodic tasks wherever the nature of a task must be distinguished by a single integer value.

public final static int SpontaneousTask

A defined constant used to represent spontaneous tasks wherever the nature of a task must be distinguished by a single integer value.

public final static int SporadicTask

A defined constant used to represent sporadic tasks wherever the nature of a task must be distinguished by a single integer value.

The real-time executive maintains an internal representation of the most recently negotiated CPU workload. Based on this representation, it takes responsibility for dispatching tasks at appropriate times. There are four different kinds of supported tasks. For periodic, sporadic, and spontaneous tasks, the real-time executive dispatches the task at the appropriate time and then trusts the task to invoke the real-time executive's relinquish( ) method at the end of its allotted time slot. For ongoing tasks, the real-time executive dispatches the task at the beginning of its time slot and suspends the task at the end of its allotted time slot. By design, all real-time tasks are granted higher priority access to system resources than non-real-time tasks. Non-real-time tasks are only allowed to execute during times when all real-time tasks are idle.

A real-time activity consists of an arbitrary number of real-time tasks, a configuration manager, and an administrator. The class definition is given in FIG. 10. The real-time executive invokes negotiate( ) whenever it is necessary to initially decide upon or revise the system resource allocation budgets. negotiate( ) returns true if the budget is acceptable and false otherwise. Assuming that negotiations succeed, the real-time executive invokes each activity's commit( ) method before switching to the new workload at some future moment in time. If, on the other hand, this real-time activity's negotiate( ) method is not willing to accept the proposed budget, it modifies whichever entries of the proposed budget it finds objectionable to represent what it considers to be the minimal acceptable quantities of these particular resources before returning false. At its discretion, the real-time executive may then attempt to propose an alternative budget by reinvoking this activity's negotiate( ) method.

Note that even if this real-time activity approves of the proposed budget, the real-time executive may decide not to move forward with the newly negotiated execution model. This is because certain other real-time activities may object to their budgets.

Each time the real-time executive modifies the resource allocation for a particular activity, it constructs an ActivitySupervisor object to represent the newly negotiated resource budget. This object maintains an array of TaskSupervisor objects with one entry for each of the real-time tasks that comprise this real-time activity. The code associated with this activity on the part of the real-time executive is given in FIG. 11.

There are four distinct kinds of real-time tasks in the RTPM: periodic, sporadic, ongoing, and spontaneous. Every real-time task extends as shown in FIG. 12.

In all cases, the implementations of startup( ) and finish( ) must be execution-time analyzable. The implementation of work( ) need not be bounded. For periodic, sporadic, and spontaneous tasks, the startup( ), work( ), and finish( ) methods are invoked in sequence each time the task is triggered. For ongoing tasks, the startup( ) method is invoked exactly once, following which the work( ) method is invoked and subsequently suspended and resumed repeatedly. The ongoing task's finish( ) method is only invoked when the corresponding real-time activity terminates.

In order to avoid the need to allocate a new thread each time a real-time task is triggered, and to standardize a trusted interface between the real-time executive and the user's code, the real-time executive creates a task supervisor thread to oversee execution of each real-time task. The implementation of this thread depends on the kind of task that is being supervised. The general structure of a supervisor task is represented by the TaskSupervisor class shown in FIG. 13.

The real-time executive considers supervisor tasks to be trustworthy. It does not impose any additional timing restrictions other than what is implemented within the supervisor. Supervisor threads are only terminated when they are in suspended states.

According to this model, the time scheduled for each task is the sum of the worst-case execution times for the task's startup( ) and finish( ) methods combined with the time allocated for execution of the optional portion of the task. Note that under transient overload conditions, the real-time executive may find it necessary to temporarily adjust a real-time task's periodic CPU allocation downward. This would be required, for example, if the system is running behind schedule or perhaps if a spontaneous (transient) workload has been added to the system. Once the overload condition passes, the real-time executive would typically increase the CPU allocation to its original value.

A PeriodicSupervisor object is used to oversee the execution of periodic, spontaneous, and sporadic tasks. Though a spontaneous task is not necessarily periodic, the exact same execution model applies. Each time the spontaneous activity is scheduled, each task executes one iteration of the run( ) method's loop as indicated in FIG. 14.

Note that this implementation does not enforce full atomicity of startup( ) and finish( ) methods. This implementation guarantees only that the startup( ) and finish( ) code segments will be executed in their entirety for each execution of the periodic task. It does not enforce mutual exclusion. If mutual exclusion is desired, it should be enforced by the programmer within the implementations of the startup( ) and finish( ) methods.

Unlike periodic, sporadic, and spontaneous tasks, an ongoing task is periodically suspended and resumed rather than being restarted. Each ongoing task is supervised by a ThreadSupervisor object, as described in FIG. 15. We assume that the real-time executive sends a ThreadDeath exception to abort the ongoing task at the appropriate time. Further, we assume that the real-time executive simply suspends and resumes the ongoing task's supervisor thread at the scheduled times.

When a real-time activity is loaded onto the system, it must first configure itself. This consists of measuring its performance in this environment followed by negotiation with the real-time executive to determine the levels of service quality that can be achieved on this host. In order to instantiate a real-time activity on a particular execution platform, currently executing "application" code must invoke the real-time executive's addActivity( ) method. In response, the real-time executive invokes the real-time activity's configure( ) method. The real-time executive maintains at least one ongoing real-time task for purposes of invoking the configure( ) methods of new activities.

The material below summarizes the work that is performed by an activity's configure( ) method.

The real-time programmer may desire that certain methods be left in byte-code form and interpreted so as to reduce code space. The activity's configure( ) method invokes the real-time executive's interpret( ) method to suggest this implementation.

In other cases, the programmer may request that methods be translated to native instructions.

The activity's configure( ) method invokes the real-time executive's translate( ) method to suggest this implementation.

In the absence of hints one way or another, the default behavior is to allow the run-time system to decide for itself whether to interpret or translate particular methods.

On systems that are capable of analyzing code to determine worst-case execution times, the configure( ) method may invoke the real-time executive's analyze( ) routine to determine the WCET of particular methods. analyze( ) returns 0 if the code is not analyzable, or −1 if the local execution environment lacks the ability to analyze code. Note that most traditional Java virtual machines lack the ability to analyze execution times of Java methods. The implementation of analyze( ) is such that the results of analysis are stored as part of the analyzed program's internal representation. Thus, analyzing a particular method a second time does not incur the same overhead as was required to analyze it the first time. Rather, the second invocation simply looks up the previously computed results.

To obtain typical task execution times and to approximate worst-case execution times on platforms that do not support execution time analysis, the real-time executive provides support for measurement of CPU time using the cpuTime( ) method. It is the real-time activity's responsibility to measure sufficient numbers of iterations of the task to represent a realistic execution time profile. Further, to approximate actual execution-time cache contention, it may be desirable for the configure( ) method to insert sleep( ) requests between consecutive invocations of the method being measured.

To determine the amount of memory required to represent a particular object's data structures, configure( ) may invoke the real-time executive's dataSize( ) and persistentDataSize( ) methods. To determine the amount of memory required to represent a particular object's instructions, configure( ) invokes the real-time executive's codeSize( ) and persistentCodeSize( ) methods. Note that any of these methods may return −1, which would indicate that the local environment is unable to determine the memory used to represent particular sorts of information.

In order to support concise and efficient communication between real-time activities and the real-time executive, we have defined an ActivityResource object. Typically, a single ActivityResource object represents the combined needs of a complete real-time activity which may include multiple real-time time tasks. The definition is given in FIG. 16. Note that the ActivityResource object maintains an array of TaskResource objects. Memory is requested and budgeted for the complete activity. However, CPU time is budgeted to the individual tasks that comprise the activity. The TaskResource class is defined in FIG. 17.

When a real-time activity is configured, the activity allocates and initializes an ActivityResource object to represent the activity's CPU-time and memory needs. Subsequently, the real-time executive examines the resource requests of all activities in the system and computes budgets for each activity. The real-time executive creates a new ActivityResource object to represent the budget it is willing to grant to this activity, and it passes this object as a parameter to negotiate( ). The activity then has an opportunity to accept or reject the proposed budget. Note that an activity may choose to reject a budget even though the budget promises to provide all of the activity's stated minimum resource requirements. The activity's minimum resource requirements may have been formulated under the assumption that only some of the resources would be constrained to their minimal budgets, or that certain resources would only occasionally be limited to their minimal budgets but would be much more abundant most of the time.

Spontaneous tasks are only allowed within special real-time activities known as spontaneous activities. Spontaneous activities are normal real-time activities in which all of the tasks are spontaneous. The handling of spontaneous activities consists of the following steps:

1. Application code creates an instance of the spontaneous activity in preparation for subsequent execution.
2. Application code introduces this activity to the real-time executive by invoking the addActivity( ) method.
3. The real-time executive's addActivity( ) method recognizes this as a spontaneous activity (since all tasks are spontaneous) and refrains from scheduling the workload. Nevertheless, it still invokes the activity's configure( ) method to enable the activity to analyze its memory and CPU-time requirements.
4. At the appropriate times, application code invokes the real-time executive's scheduleSpontaneous( ) method to request execution of the spontaneous workload.

Many embedded real-time systems need for certain information to persist even after the system crashes or has been rebooted. Objects that continue to live even after the system has been restarted are labeled as persistent.

The RTPM provides run-time support for creation and maintenance of persistent objects. In the RTPM, a Persistent interface is defined which declares several fields for use by the PersistencyManager, which is also defined within the RTPM. The PersistencyManager implements the following methods:

static private void bootstrap( )

Soon after a system is restarted, it is necessary to invoke this method in order to cause all of the objects which have been stored in persistent memory to be reactivated. This method is automatically invoked when the PersistencyManager class is first loaded.

static void createShadow(Persistent o)

When a new object o is created, the application code must invoke this method to request of the PersistencyManager that it create a non-volatile shadow copy of the object.

static void deleteShadow(Persistent o)

When it is determined that a particular shadow object is no longer needed, the application code invokes the deleteShadow( ) method. As a matter of practice, it would be advisable to include an invocation of deleteShadow( ) in the finalization code of all Persistent objects.

static void updateShadow(Persistent o) throws ReferenceNotPersistent

The persistent shadow copy of object o is not automatically updated each time the contents of o changes. Rather, application code must explicitly invoke the updateShadow( ) method to request that its modified contents be written to stable storage. updateShadow( ) guarantees that updates are atomic in the sense that if the system crashes in the middle of executing this method, the complete persistent copy of o will either have its original values (immediately before invocation of updateShadow( ) or its new values (the values represented by the argument to updateShadow( )). Furthermore, the PersistencyManager coordinates with the real-time executive to ensure that if multiple updateShadow( ) invocations appear within a single atomic segment, either all or none of the updateShadow( ) commands are considered to have completed if the system crashes in the middle of executing the atomic segment. One possible implementation consists of creating in stable storage an edit script that represents all of the changes that need to be applied before making any changes to the shadow objects. If the system crashes before the edit script has been completely written to stable memory, the persistent objects hold their original values when the system restarts. If the system crashes after the edit script has been created but before it has been completely executed, the persistent objects are automatically edited by the bootstrap( ) method.

It is the PersistencyManager's responsibility to determine the most efficient way to reliably implement persistent memory. Depending on the system's hardware configuration, persistent memory can be implemented using, for example, magnetic media, flash memory, battery-backed static RAM, or remote storage accessed by way of network connections. In some environments, it would be appropriate to implement persistent memory using a combination of these mechanisms. In fact, it is within the PersistencyManager's stewardship to automatically move persistent objects between different non-volatile memory segments in order to optimize access efficiency based on recent access patterns.

When power is restored to a system that contains persistent objects, the following actions are performed as part of the implementation of the bootstrap( ) method:

1. Any persistent objects that were in an inconsistent state at the time the system was shut down are made consistent. In other words, if an atomic update had only partially completed when power was lost, the remainder of the update is performed now.
2. For each persistent object in stable storage, create a heap-memory copy which will be shadowed by this persistent copy.
3. For any of the heap objects created in step 2 which are of type RealTime.Activity, introduce the object to the real-time executive by invoking the addActivity( ) method. This results in configuration of the real-time activity followed by negotiation for object resources. Note that a persistent real-time activity may choose to save the results of prior configuration as part of its persistent state so that subsequent attempts to reconfigure (following, for example, a system crash) need not repeat all of the analysis that was required when the activity was first configured.
4. For any of the heap objects created in step 2 which are Runnable but were not involved in real-time activities, invoke the object's run( ) method.

It seems that implementation of these capabilities on a RTPM virtual machine would be straightforward. It is less clear that this can be efficiently implemented on traditional virtual machines, but it should be possible through the use of native methods in the implementation of the PersistencyManager object.

The presence of persistent memory introduces the possibility that byte-code translations might be preserved across system restart. Given that considerable optimization effort will be required to obtain high-performance translations of Java byte codes, it would be very desirable to avoid the need to retranslate byte codes each time the system is restarted. We leave this as a hint to the implementors, and suggest that this is a performance optimization that would be especially useful in relatively static embedded processing applications. To make this optimization more generally useful, it might be desirable to define conditions under which translations of network-downloadable byte codes could be cached rather than being retranslated each time they are required.

What is claimed is:

1. A real-time programming method (RTPM) for use in writing application programs to be executed by virtual machines, the RTPM comprising:

utilizing a method selected from the group consisting of a configure method and a negotiate method, the invocation of the configure method in an application program resulting in the quantification of the needs for one or more resources during execution of the application program by a virtual machine, the invocation of the negotiate method in an application program causing a negotiation to occur between the application program and the virtual machine concerning the allocation of one or more resources to the application program, the one or more resources being selected from the group consisting of CPU time, total memory, and memory allocation rate.

2. The RTPM of claim 1 wherein the configure method is selected.

3. The RTPM of claim 2 wherein the quantification pertains to the allocation of CPU time.

4. The RTPM of claim 2 wherein the quantification pertains to the allocation of total memory.

5. The RTPM of claim 2 wherein the quantification pertains to the allocation of memory allocation rate.

6. The RTPM of claim 1 wherein the negotiate method is selected.

7. The RTPM of claim 6 wherein the negotiation pertains to the allocation of CPU time.

8. The RTPM of claim 6 wherein the negotiation pertains to the allocation of total memory.

9. The RTPM of claim 6 wherein the negotiation pertains to the allocation of memory allocation rate.

10. The RTPM of claim 1 further comprising:
utilizing a timed-statement control structure, the control structure consisting of (1) a keyword identifying the structure, (2) a specified increment of time, and (3) a specified code segment, it being anticipated that the specified code segment will execute within the specified increment of time, execution otherwise being aborted.

11. The RTPM of claim 1 further comprising:
utilizing a preemptible-timed-statement control structure, the control structure consisting of (1) a keyword identifying the structure, (2) a specified increment of time, and (3) a specified code segment, it being anticipated that the specified code segment will execute during a plurality of time slices within an execution period, the plurality of time slices adding up to the specified increment of time, execution otherwise being aborted.

12. The RTPM of claim 1 further comprising:
utilizing an aperiodic-timed-statement control structure, the control structure consisting of (1) a keyword identifying the structure, (2) a specified increment of time, and (3) a specified code segment, it being anticipated that the specified code segment will execute in time segments spread over a plurality of execution periods, the time segments in the plurality of execution periods adding up to the specified increment of time, execution otherwise being aborted.

13. The RTPM of claim 1 further comprising:
utilizing an atomic-statement control structure, the control structure consisting of (1) a keyword identifying the structure and (2) a specified code segment, the specified code segment being execution-time analyzable, the control structure requiring that either enough time be assigned to execute the specified code segment or that none be assigned.

14. The RTPM of claim 1 wherein real-time tasks include periodic, sporadic, ongoing, and spontaneous real-time tasks, the method of execution of a real-time task comprising a startup( ) method, a work( ) method, and a finish( ) method, the startup( ) and finish( ) methods being execution-time analyzable, the startup( ), work( ), and finish( ) methods being invoked in sequence each time a periodic, sporadic, or spontaneous task is executed, the startup( ) method being invoked exactly once for an ongoing task following which the work( ) method is invoked and suspended repeatedly, the finish( ) method for the ongoing task being invoked only when the corresponding real-time activity terminates.

15. The RTPM of claim 1 further comprising:
utilizing a real-time executive object to provide services in response to requests by the application code, the services being intended to provide information relating to the real-time activities.

16. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
long analyze WCET(String methodName) which returns the worst-case time required to execute the specified method.

17. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
long analyzeEET(String methodName) which returns the expected time required to execute the specified method.

18. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
int codeSize(Object o) which returns the worst-case number of bytes required to represent the object o's instruction and static memory data.

19. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
int dataSize(Object o) which returns the worst-case number of bytes required to represent the data belonging to object o.

20. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
void interpret(String methodName) which provides a suggestion to an underlying run-time system that this method should not be translated to native code but should instead be interpreted each time it is executed.

21. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
int persistentCodeSize(Persistent o) which returns the worst-case number of bytes of non-volatile memory required to represent the object o's instruction and static memory data.

22. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
int persistentDataSize(Persistent o) which returns the worst-case number of bytes of non-volatile memory required to represent the data belonging to object o.

23. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
  Object [ ] references(Object o) which returns an array of objects representing all of the memory directly referenced by object o.

24. The RTPM of claim 15 further comprising:
utilizing a real-time executive object to provide services in response to requests by an application code, the services including providing data concerning the configuration of real-time activities for the purpose of facilitating analysis of execution times and memory requirements, the requests for service comprising:
  void translate(String methodName) which provides a suggestion to an underlying run-time system that this method should be translated to native code rather than be interpreted each time it is executed.

25. The RTPM of claim 15 further comprising:
utilizing a real-time executive object to provide services in response to requests by an application code, the services including providing data concerning time, the requests for service comprising:
  long cpuTime( ) which reports the amount of CPU time in increments smaller than one microsecond that has been executed by the current thread.

26. The RTPM of claim 15 further comprising:
utilizing a real-time executive object to provide services in response to requests by an application code, the services including providing data concerning time, the requests for service comprising:
  void sleep(long increment) and void sleep(int increment) which put the currently executing thread to sleep for a time period specified in increments smaller than one microsecond.

27. The RTPM of claim 15 further comprising:
utilizing a real-time executive object to provide services in response to requests by an application code, the services including providing data concerning time, the requests for service comprising:
  int timeAccuracy( ) which returns the resolution of the local time measuring device in increments smaller than one microsecond.

28. The RTPM of claim 15 further comprising:
utilizing a real-time executive object to provide services in response to requests by an application code, the services including providing data concerning time, the requests for service comprising:
  long upTime( ) which returns the time period in increments smaller than one microsecond since system startup.

29. The RTPM of claim 15 further comprising:
utilizing a real-time executive object to provide services in response to requests by an application code, the services including negotiating CPU time and memory resources, the requests for service comprising:
  boolean addActivity(Activity a) which requests that a new real-time activity be added to an existing workload of activities, the request automatically invoking the configure( ) method for the new activity, the configure( ) method returning a representation of the activity's resource needs and wants, the request then invoking the negotiate( ) method for this and other currently executing activities in order to arrange a mutually agreeable allocation of resources.

30. The RTPM of claim 15 further comprising:
utilizing a real-time executive object to provide services in response to requests by an application code, the services including negotiating CPU time and memory resources, the requests for service comprising:
  boolean addBiasedActivity(Activity a, float importance, float timeSpaceRatio) which requests that a new real-time activity be added to an existing workload of activities, the new activity being accorded preferential treatment, the request automatically invoking the configure( ) method for the new activity, the configure( ) method returning a representation of the activity's resource needs and wants, the request then invoking the negotiate( ) method for this and other currently executing activities in order to arrange a mutually agreeable allocation of resources.

31. The RTPM of claim 15 further comprising:
utilizing a real-time executive object to provide services in response to requests by an application code, the services including negotiating CPU time and memory resources, the requests for service comprising:
  void removeActivity(Activity a) which removes an existing real-time activity from the current workload.

32. The RTPM of claim 31 wherein all requests to kill existing real-time tasks are directed to the real-time executive by invoking the removeActivity( ) method.

33. The RTPM of claim 15 further comprising:
utilizing a real-time executive object to provide services to an application code, the services including negotiating CPU time and memory resources, the requests for service comprising:
  void renegotiate(Activity a, ActivityResource p) which modifies the resource request of real-time activity as specified by p.

34. The RTPM of claim 15 further comprising:
utilizing a real-time executive object to provide services in response to requests by an application code, the services including negotiating CPU time and memory resources, the requests for service comprising:
  boolean scheduleSpontaneous(Activity a, ActivityResource r, long maxReleaseTime) and boolean scheduleSpontaneous(Activity a, ActivityResource r, int maxReleaseTime) which schedules spontaneous tasks for one-time execution with release sometime between the present and maxReleaseTime with individual task deadlines as described by argument r, a representing a collection of spontaneous tasks and r representing their collective resource requirements.

35. The RTPM of claim 15 further comprising:
utilizing a real-time executive object to provide services in response to requests by an application code, the services including run-time support for atomic segments, an atomic segment being executed either in its entirety or not at all, the method of execution of a real-time task comprising a startup( ) method, a work( ) method, and a finish( ) method, the currently executing thread being a supervisor for a real-time task, the requests for service comprising:
  void enterAtomic(Object o, AtomicSegmentId asi, int executionTime) and void enterAtomic(Object o, AtomicSegmentId asi, long executionTime) which, if the virtual machine is a multiprocessor system, places the specified task on a wait queue associated with object o's lock if some other task is currently locking access to object o, the specified task remaining on the wait queue until access is granted or until the specified task's current time slice expires, the specified task being suspended if the time slice expires first and enterAtomic( ) restarted if and when the specified task is resumed, the term "suspended" meaning that (1) the specified task is put to sleep until its next scheduled execution time slot if the specified task is an ongoing task, (2) the specified task is put to sleep until its next scheduled time slice if the specified task is a periodic, sporadic or spontaneous task, and it is scheduled to receive additional time slices within its current period, and (3) the execution of the work( ) method for the specified task is aborted and the real-time executive invokes the specified task's finish( ) method if the specified task is a periodic, sporadic, or spontaneous task and it is not scheduled to receive additional time slices within its current period.

36. The RTPM of claim 15 further comprising:
utilizing a real-time executive object to provide services in response to requests by an application code, the services including run-time support for atomic segments, an atomic segment being executed either in its entirety or not at all, the method of execution of a real-time task comprising a startup( ) method, a work( ) method, and a finish( ) method, the currently executing thread being a supervisor for a real-time task, the requests for service comprising:
  void enterAtomic(Object o, AtomicSegmentId asi, int executionTime) and void enterAtomic(Object o, AtomicSegmentId asi, long executionTime) which suspends the specified task if there is insufficient time in the current time slice to execute the complete atomic statement, the term "suspended" meaning that (1) the specified task is put to sleep until its next scheduled execution time slot if the specified task is an ongoing task, (2) the specified task is put to sleep until its next scheduled time slice if the specified task is a periodic, sporadic or spontaneous task, and it is scheduled to receive additional time slices within its current period, and (3) the execution of the work( ) method for the specified task is aborted and the real-time executive invokes the specified task's finish( ) method if the specified task is a periodic, sporadic, or spontaneous task and it is not scheduled to receive additional time slices within its current period.

37. The RTPM of claim 15 further comprising:
utilizing a real-time executive object to provide services in response to requests by an application code, the services including run-time support for atomic segments, an atomic segment being executed either in its entirety or not at all, the requests for service comprising:
  void enterAtomic(Object o, AtomicSegmentId asi, int executionTime) and void enterAtomic(Object o, AtomicSegmentId asi, long executionTime) which sets the value of asi to represent the specified atomic segment and sets appropriate flags within the real-time executive to prohibit other tasks from executing atomic statements that belong to object o if the virtual machine is a multiprocessor system.

38. The RTPM of claim 15 further comprising:
utilizing a real-time executive object to provide services in response to requests by an application code, the services including run-time support for atomic segments, an atomic segment being executed either in its entirety or not at all, the currently executing thread being a supervisor for a real-time task, the requests for service comprising:
  void exitAtomic(AtomicSegmentId asi) indicating that the currently executing thread is now leaving the atomic region identified by asi, the request releasing the mutual exclusion constraint on the specified object o that is identified by asi thereby permitting other tasks access to o's atomic segments.

39. The RTPM of claim 15 further comprising:
utilizing a real-time executive object to provide services in response to requests by an application code, the services including run-time support for timed statements, a timed statement being a statement that is bounded in execution time, the requests for service comprising:
  boolean alarmSet(Alarmid a) which returns true if and only if the alarm represented by argument a has been initialized, the request otherwise returning false;
  void clearAlarm(Alarmid a) which removes the specified alarm a from the timeout queue if the corresponding alarm is set.

40. The RTPM of claim 15 further comprising:
utilizing a real-time executive object to provide services in response to requests by an application code, the services including run-time support for timed statements, a timed statement being a statement that is bounded in execution time, the currently executing thread being a supervisor for a periodic real-time task, the requests for service comprising:
  private void relinquish() which suspends the supervisor until the next time that it is appropriate to trigger its execution.

41. The RTPM of claim 15 further comprising:
utilizing a real-time executive object to provide services in response to requests by an application code, the services including run-time support for timed statements, a timed statement being a statement that is bounded in execution time, the requests for service comprising:
  void skewClock(long tinc) which adjusts pending alarm times by tinc time increments.

42. The RTPM of claim 41 wherein all exception handlers and finally clauses in VMPM source code that are executed by real-time threads are execution-time analyzable, the RTPM virtual machine constructing a call graph for each real-time thread, the RTPM further comprising:
  a byte code analysis method which utilizes the call graph for a real-time thread to identify all of the methods that might be invoked by the real-time thread, the byte code analysis method further comprising:
    identifying all of the exception handlers and finally clauses within each of the identified methods;
    determining the worst-case execution time for each exception handler and for each finally clause;
    inserting an invocation of the real-time executive's skewClock( ) method at each entry into the body of a try statement for the purpose of instructing the real-time executive to abort the execution time at time X−T rather than X where T is the maximum time required to execute one of the try statement's exception handlers added to the time required to execute the try statement's finally clause;
    inserting an invocation of the real-time executive's skewClock( ) method at the end of the try statement's body to restore the timeout clock to its original value.

43. The RTPM of claim 15 further comprising:

utilizing a real-time executive object to provide services in response to requests by an application code, the services including run-time support for timed statements, a timed statement being a statement that is bounded in execution time, the method of execution of a real-time task comprising a startup( ) method, a work( ) method, and a finish( ) method, the requests for service comprising:

void startTimed(int timeLimit, Alarmidentity alarmid) and void startTimed(long timeLimit, Alarmidentity alarmid) which causes the real-time executive to suspend the thread if there is insufficient time in the current time slice to execute the complete timed statement, the term "suspended" meaning that (1) the specified task is put to sleep until its next scheduled execution time slot if the specified task is an ongoing task, (2) the specified task is put to sleep until its next scheduled time slice if the specified task is a periodic, sporadic, or spontaneous task, and it is scheduled to receive additional time slices within its current period, and (3) the execution of the work( ) method for the specified task is aborted and the real-time executive invokes the specified task's finish( ) method if the specified task is a periodic, sporadic, or spontaneous task and it is not scheduled to receive additional time slices within its current period.

44. The RTPM of claim 15 further comprising:

utilizing a real-time executive object to provide services in response to requests by an application code, the services including run-time support for timed statements, a timed statement being a statement that is bounded in execution time, the requests for service comprising:

void startTimed(int timeLimit, Alarmidentity alarmid) and void startTimed(long timeLimit, Alarmidentity alarmid) which causes the real-time executive to set an alarm which is scheduled to expire in (timeLimit—B CPU-time-increments), B representing the worst-case time required by the task's exception handlers to respond to the timeout exception added to the maximum time spent within the implementation of startTimed( ) between the time at which a first condition is satisfied and the time at which the alarm is set, the first condition being that there is sufficient time in the current time slice to execute the complete timed statement, the alarmID object being updated to reflect the identity of the set alarm at the same time the alarm is set, the real-time executive sending a ThreadDeath exception to this task at the specified alarm time.

45. The RTPM of claim 15 further comprising:

utilizing a real-time executive object to provide services in response to requests by an application code, the services including run-time support for timed statements, a timed statement being a statement that is bounded in execution time, the method of execution of a real-time task comprising a startup( ) method, a work( ) method, and a finish( ) method, the requests for service comprising:

void startTimedPreemptible(int timeLimit, Alarmidentity alarmid) and void startTimedPreemptible(long timeLimit, Alarmidentity alarmid) which cause the real-time executive to suspend the thread if there is insufficient time in the current time period to execute the complete timed statement, the specified task being put to sleep until its next scheduled execution time slot if the specified task is an ongoing task, the real-time executive aborting execution of the work( ) method and invoking the specified task's finish( ) method if the specified task is a periodic, sporadic, or spontaneous task.

46. The RTPM of claim 15 further comprising:

utilizing a real-time executive object to provide services in response to requests by an application code, the services including run-time support for timed statements, a timed statement being a statement that is bounded in execution time, the requests for service comprising:

void startTimedPreemptible(int timeLimit, Alarmidentity alarmid) and void startTimedPreemptible(long timeLimit, Alarmidentity alarmid) which cause the real-time executive to set an alarm which is scheduled to expire in (timeLimit—B CPU-time-increments), B representing the worst-case time required by the task's exception handlers to respond to the timeout exception added to the maximum time spent within the implementation of startTimedPreemptible( ) between the time at which a first condition is satisfied and the time at which the alarm is set, the first condition being that there is sufficient time in the current time period to execute the complete timed statement, the alarmID object being updated to reflect the identity of the set alarm at the same time the alarm is set, the real-time executive sending a ThreadDeath exception to this task at the specified alarm time.

47. The RTPM of claim 15 further comprising:

utilizing a real-time executive object to provide services in response to requests by an application code, the services including run-time support for timed statements, a timed statement being a statement that is bounded in execution time, the method of execution of a real-time task comprising a startup( ) method, a work( ) method, and a finish( ) method, the requests for service comprising:

void startTimedAperiodic(int timeLimit, Alarmidentity alarmid) and void startTimedAperiodic(long timeLimit, Alarmidentity alarmid) which prepares for execution of a timed aperiodic statement of duration specified by timeLimit, the real-time executive setting an alarm which is scheduled to expire in (timeLimit—B CPU-time-increments), B representing the worst-case time required by the task's exception handlers to respond to the timeout exception added to the maximum time spent within the implementation of startTimed( ) between the time at which a first condition is satisfied and the time at which the alarm is set, the first condition being that the currently executing task is an ongoing task, the real-time executive aborting the execution of the work( ) method and invoking the task's finish( ) method if the currently executing task is not an ongoing task, the alarmID object being updated to reflect the identity of the alarm at the same time the alarm is set, the real-time executive sending a ThreadDeath exception to this task when the alarm time arrives.

48. The RTPM of claim 15 further comprising:

utilizing a real-time executive object to provide services in response to requests by an application code, the services including run-time support for dynamic memory management, budgets for each activity's allocation of volatile and non-volatile memory being enforced by the real-time executive, the requests for service comprising:
int allocatableBytes( ) which returns the number of bytes of volatile memory that the currently executing activity has permission to allocate, the request returning a special code if the real-time executive is not able to track the memory usage of activities, each activity's budget being increased as memory is reclaimed by the garbage collector and being decreased as the tasks that comprise the activity allocate memory.

49. The RTPM of claim 15 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
int allocatablePersistentBytes( ) which returns the number of bytes of non-volatile memory that the currently executing activity has permission to allocate, the request returning a special code if the real-time executive is not able to track the persistent memory usage of activities, each activity's budget being increased as persistent memory is reclaimed by the garbage collector and being decreased as the tasks that comprise the activity allocate persistent memory.

50. The RTPM of claim 15 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
void doGC(int memSize, int persistentSize) causes the real-time executive to perform garbage collection during what was to have been the task's CPU-time slice until there is enough allocatable memory for the given activity to allow a single object of memSize bytes and a single persistent object of persistentSize bytes to be allocated, the task being suspended until its next scheduled execution if the time slice expires before the requested memory has been obtained.

51. The RTPM of claim 15 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
void enableMemAllocExceptions( ) informs the real-time executive that a task prefers to receive an OutOfMemoryError exception whenever one of its memory allocation requests cannot immediately be satisfied.

52. The RTPM of claim 15 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
int largestAllocatable( ) returns the size of the largest contiguous block of memory that the virtual machine promises to be able to allocate at the current time.

53. The RTPM of claim 15 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
int largestPersistentAllocatable( ) returns the size of the largest contiguous block of persistent memory that the virtual machine promises to be able to allocate at the current time.

54. The RTPM of claim 15 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
void suppressMemAllocExceptions( ) informs the real-time executive that a task desires to automatically relinquish its scheduled execution time to the garbage collector whenever one of its allocation requests cannot be satisfied, the garbage collector being allowed to execute until such time as the task's time slot expires or until the garbage collector reclaims the memory required to satisfy the allocation request.

55. The RTPM of claim 15 further comprising:
utilizing a real-time executive object to provide services in response to requests by an application code, the services including run-time support for run-time scheduling, the real-time executive dispatching real-time tasks according to agreed-upon real-time schedules, a real-time scheduler waiting for a relinquish( ) invocation to terminate a task's time slot for periodic, sporadic, and spontaneous tasks, the real-time executive automatically suspending a task at the end of its allotted time slot after first waiting for ongoing execution of any atomic segments to be completed for ongoing tasks, an atomic segment being executed either in its entirety or not at all, the requests for service comprising:
void triggerTask(TaskDescriptor taskid) throws FrequencyExcess, TaskNotReady causes the real-time executive to initiate execution of a sporadic task, taskid representing the task to be executed, the real-time executive releasing the task for execution at whatever priority was determined appropriate at resource negotiation time after first verifying that the specified task has not yet exceeded its previously negotiated execution frequency, the real-time executive throwing a FrequencyExcess exception if the task has already used up its execution frequency budget, FrequencyExcess being an exception that is thrown by the real-time executive's triggerTask( ) method whenever an attempt is made to invoke a sporadic task more frequently than was arranged at resource negotiation time, the triggerTask( ) method causes a specified task to be released for execution, the triggerTask( ) throwing a TaskNotReady exception if taskid equals null or represents a task that is not sporadic or belongs to an activity that is no longer running.

56. The RTPM of claim 15 further comprising:
utilizing a real-time executive object to provide services in response to requests by an application code, the services including the granting of requests for preferential treatment in allocating resources.

57. The RTPM of claim 15 further comprising:
utilizing a real-time executive object to provide services in response to requests by an application code, the services including the allocation of resources to activities in accordance with their importance.

58. The RTPM of claim 15 wherein static objects are declared and initialized in the real-time executive object, the static objects including a defined constant used to represent ongoing tasks wherever the nature of a task must be distinguished by a single integer value, an object that can be thrown by a real-time activity needing to throw a timeout exception in order to avoid allocating a time-out object on the fly, and a defined constant used to represent periodic tasks wherever the nature of a task must be distinguished by a single integer value, a defined constant used to represent a spontaneous task wherever the nature of the task must be distinguished by a single integer value, and a defined constant used to represent a sporadic task wherever the nature of the task must be distinguished by a single integer value.

59. The RTPM of claim 15 wherein the real-time executive maintains an internal representation of the most recently negotiated CPU workload and dispatches tasks at appropriate times in accordance with the most recently negotiated CPU workload.

60. The RTPM of claim 59 wherein the real-time executive dispatches a task at the appropriate time and then trusts the task to invoke the real-time executive's relinquish method at the end of its allotted time slot when the task is a periodic, sporadic, or spontaneous task.

61. The RTPM of claim 59 wherein the real-time executive dispatches a task at the beginning of its time slot and suspends the task at the end of its allotted time slot when the task is ongoing.

62. The RTPM of claim 15 wherein a real-time activity loaded into a virtual machine configures itself by measuring its performance and then negotiating with the real-time executive to determine the levels of service quality that can be achieved, the currently executing application code instantiating the real-time activity into the virtual machine by invoking the real-time executive's addActivity( ) method, the real-time executive responding by invoking the real-time activity's configure( ) method, the real-time executive maintaining at least one ongoing real-time task for purposes of invoking the configure( ) methods of new activities.

63. The RTPM of claim 1S wherein the real-time executive includes an interpret() method and a translate( ) method, the real-time executive invoking a real-time activity's configure( ) method when the real-time activity is added to the system workload, the configure( ) method invoking the real-time executive's interpret( ) method to interpret methods that appear in abstract form, the configure( ) method invoking the real-time executive's translate( ) method to translate methods into native instructions, the default condition being to allow the run-time system to decide for itself whether to interpret or translate particular methods.

64. The RTPM of claim 15 wherein the real-time executive includes an analyze( ) method and each real-time activity includes a configure( ) method, the real-time executive invoking a real-time activity's configure( ) method when the real-time activity is added to the system workload, the configure( ) method invoking the real-time executive's analyzeWCET( ) method to determine the expected execution time of a method, analyzeWCET( ) returning a first special code if the code is not analyzable or a second special code if the local execution environment lacks the ability to analyze code, the results of the analysis being stored as part of the analyzed method's internal representation.

65. The RTPM of claim 15 wherein the real-time executive includes an analyze( ) method and each real-time activity includes a configure( ) method, the real-time executive invoking a real-time activity's configure( ) method when the real-time activity is added to the system workload, the configure( ) method invoking the real-time executive's analyzeEET( ) method to determine the worstcase execution time of a method, analyzeEET( ) returning a first special code if the code is not analyzable or a second special code if the local execution environment lacks the ability to analyze code, the results of the analysis being stored as part of the analyzed method's internal representation.

66. The RTPM of claim 15 wherein the real-time executive includes a cpuTime( ) method and each real-time activity includes a configure( ) method, the real-time executive invoking a real-time activity's configure( ) method when the real-time activity is added to the system workload, the configure( ) method invoking the real-time executive's cpuTime( ) method to measure typical execution times.

67. The RTPM of claim 66 wherein the real-time executive includes a sleep( ) request for putting a currently executing thread to sleep for a specified time period, the configure( ) method inserting a real-time executive's sleep( ) request between each of a plurality of consecutive invocations of the method being measured in order to approximate execution-time cache contention.

68. The RTPM of claim 15 wherein the real-time executive includes a dataSize( ) method and a persistentDataSize( ) method and each real-time activity includes a configure( ) method, the real-time executive invoking a real-time activity's configure( ) method when the real-time activity is added to the system workload, the configure( ) method invoking the real-time executive's dataSize( ) method and persistentDataSize( ) method to determine the amount of memory required to represent a particular object's data structures, the methods returning a special code if the local environment is unable to determine the memory used to represent the object's data structures.

69. The RTPM of claim 15 wherein the real-time executive includes a codeSize( ) method and persistentCodeSize( ) method and each real-time activity includes a configure( ) method, the real-time executive invoking a real-time activity's configure( ) method when the real-time activity is added to the system workload, the configure( ) method invoking the real-time executive's codeSize( ) method and persistentCodeSize( ) method to determine the amount of memory required to represent a particular object's instructions, the methods returning a special code if the local environment is unable to determine the memory used to represent the object's instructions.

70. The RTPM of claim 15 wherein each real-time activity includes a configure( ) method, a negotiates method, and a commit() method, the real-time executive invoking a real-time activity's configure( ) method when the real-time activity is added to the system workload, the real-time activity responding with a representation of the activity's resource needs and wants, the real-time executive invoking the negotiate( ) method and proposing a budget, the real-time activity responding with "agree" or a proposed budget revision followed by "disagree", the real-time executive having the option of invoking the commit() method in the real-time activity if the response was "agree".

71. The RTPM of claim 70 wherein the proposing-a-budget step allows the real-time executive to propose alternative budgets if particular activities respond with "disagree".

72. The RTPM of claim 15 wherein the real-time executive constructs an activity supervisor object to represent a newly negotiated resource budget for a particular real-time activity, the activity supervisor object maintaining an array of task supervisor objects with one entry for each of the real-time tasks that comprise the real-time activity.

73. The RTPM of claim 72 wherein the real-time executive creates a task supervisor thread to oversee execution of each real-time task, a task supervisor thread being an instance of a task supervisor class.

74. The RTPM of claim 73 wherein the real-time executive creates a periodic task supervisor thread to oversee execution of a periodic, spontaneous, or sporadic task, a periodic task supervisor thread being an instance of a periodic task supervisor class, the periodic task supervisor class being a subclass of the task supervisor class.

75. The RTPM of claim 73 wherein the real-time executive creates a thread supervisor object to oversee execution of an ongoing task, a thread supervisor object being an instance of a thread supervisor class, the thread supervisor class being a subclass of the task supervisor class.

76. The RTPM of claim 15 wherein each real-time activity includes a configure( ) method and a negotiate( ) method, invoking the configure( ) method causing the real-time activity to allocate and initialize an activity resource object to represent the activity's CPU-time and memory needs, the real-time executive subsequently examining the resource requests of all real-time activities in the system and computing budgets for each real-time activity, the real-time executive creating a new activity resource object to represent the budget it is willing to grant to each real-time activity and passing this object as a parameter to the real-time activity's negotiate( ) method, the real-time activity then having an opportunity to accept or reject the proposed budget.

77. The RTPM of claim 15 wherein the real-time executive includes an addActivity( ) method and a scheduleSpontaneous( ) method and each real-time activity includes a configure( ) method, spontaneous activities being in the real-time activities class, spontaneous activities comprising only spontaneous tasks, an application code creating an instance of a spontaneous activity in preparation for subsequent execution, the application code introducing the spontaneous activity to the real-time executive by invoking the addActivity( ) method, the addActivity( ) method refraining from scheduling the workload associated with the spontaneous activity, the real-time executive invoking the spontaneous activity's configure( ) method to enable the activity to analyze its memory and CPU-time requirements, the application code subsequently invoking the real-time executive's scheduleSpontaneous( ) method to request execution of the workload associated with the spontaneous activity.

78. The RTPM of claim 15 further comprising:
utilizing a real-time executive object to provide services to an application code, the services including negotiating CPU time and memory resources, the requests for service comprising:
ActivityInventory getBiases( ) which returns an ActivityInventory object that represents all of the activities in the current workload along with the importance and timeSpaceRatio of each, importance being a measure of the importance of an activity, timeSpaceRatio expressing the desired ratio of the fractional scaleback in CPU time to the fractional scaleback in memory space.

79. The RTPM of claim 78 wherein the PersistencyManager implements:
a bootstrap( ) method invoked soon after a virtual machine is restarted in order to reactivate all of the objects which have been stored in persistent memory, the bootstrap( ) method being automatically invoked when the PersistencyManager class is first loaded;
a createShadow(Persistent o) method invoked by the application code to request the PersistencyManager to create a non-volatile shadow copy of the object o;
a deleteShadow(Persistent o) method invoked by the application code to delete shadow object o;
an updateShadow(Persistent o) throws ReferenceNotPersistent method invoked by the application code to request that the modified object o be written to persistent memory, the method guaranteeing that if the virtual machine crashes during the execution of the method, the complete persistent copy of object o will either have its original values or its new values, the PersistencyManager ensuring that if multiple updateShadow( ) invocations appear within a single atomic segment, either all or none of the updateShadow( ) commands are considered to have completed if the system crashes during execution of the atomic segment, an atomic segment being executed either in its entirety or not at all.

80. The RTPM of claim 15 further comprising:
utilizing a real-time executive object to provide services to an application code, the services including negotiating CPU time and memory resources, the requests for service comprising:
void biasWorkload(ActivityInventory newBias) which causes the importance and timeSpaceRatio entries for each of the activities that is in both the current workload and in newBias, importance being a measure of the importance of an activity, timeSpaceRatio expressing the desired ratio of the fractional scaleback in CPU time to the fractional scaleback in memory space.

81. The RTPM of claim 80 wherein when power is restored to a virtual machine that contains persistent objects, the bootstrap( ) method comprises:
(a) making consistent those persistent objects that were in an inconsistent state at the time the virtual machine shut down;
(b) creating a heap-memory copy which will be shadowed by the persistent copy for each persistent object in persistent memory;
(c) introducing any of the objects created in (b) which are of type RealTime.Activity to the real-time executive by invoking the addActivity( ) method thereby causing the configuration of the real-time activity followed by negotiation for object resources;
(d) invoking the object's run( ) method for any of the heap objects created in (b) which are Runnable but were not involved in real-time activities.

82. The RTPM of claim 15 further comprising:
utilizing a real-time executive object to provide services to an application code, the services including negotiating CPU time and memory resources, the requests for service comprising:
long systemCycleTime( ) which returns the number of time increments required to execute one period of the system's cyclic schedule, systemCycleTime( ) returning a special code if the system is not currently using a cyclic dispatch table.

83. The RTPM of claim 1 further comprising:
utilizing a virtual machine code analysis method at the time of execution of a program to determine the worst-case execution time of a program fragment, a program fragment being represented as a control-flow graph, a program fragment being marked as to whether (1) it has not yet been analyzed, (2) it is currently being analyzed, (3) it has been shown to be unanalyzable, or (4) it has already been analyzed, the byte code analysis method comprising:
aborting the analysis if (2), (3), or (4) is true;
aborting the analysis and marking the fragment's status as (3) if any of the methods invoked within the loop are not final;
identifying all of the loops in the program fragment;
identifying a loop header and footer for each loop, the analysis being aborted and the fragment's status being marked as (3) if a header and footer cannot be found for each loop;
starting with the innermost nested loops and working outward:
identifying all basic induction variables;
identifying the set of constant-initiated induction variables contained in the set of basic induction variables, the analysis being aborted and the fragment's status being marked as (3) if the constant-initiated induction variables set is empty;
identifying the set of iteration-bound induction variables contained in the set of constant-initiated induction variables, the analysis being aborted and the fragment's status being marked as (3) if the iteration-bound induction variables set is empty;
identifying all of the decision points by which control may leave the loop;
identifying the set of obligatory decision points contained in the set of decision points, the analysis being aborted and the fragment's status being marked as (3) if the obligatory decision points set is empty;
identifying the set of obligatory decision points that are based on magnitude comparison of an iteration-bound induction variable with a constant, the analysis being aborted and the fragment's status being marked as (3) if the magnitude-comparison-based obligatory decision points set is empty;
determining the worst-case execution time from the bound for the maximum number of loop iterations given by the obligatory decision point that represents the tightest bound;
calculating the worst-case execution time of the non-iterative loop components as the maximum worst-case execution time for any path from the component's entry point to its exit point, carefully considering pipeline and cache effects.

84. The RTPM of claim 1 wherein the stop( ) method is used to send a ThreadDeath exception to an executing thread when the alarm time is reached, it being arranged to catch this exception and respond appropriately rather than allowing the exception to abort the thread.

85. The RTPM of claim 1 further comprising:
utilizing an activity resource object to represent the memory and CPU time needs of a real-time activity, the activity resource object being an instance of an activity resource class.

86. The RTPM of claim 85 wherein an activity resource object maintains an array of task resource objects, memory being requested and budgeted for the real-time activity, CPU time being budgeted for the individual real-time tasks that comprise a real-time activity.

87. A method practiced by a real-time virtual machine (RTVM) while executing an application program written in accordance with a real-time programming method (RTPM), the RTVM method comprising:
executing a method selected from the group consisting of a configure method and a negotiate method, the execution of the configure method resulting in the quantification of the needs for one or more resources by the application program, the execution of the negotiate method causing a negotiation to occur between the application program and the virtual machine concerning the allocation of one or more resources to the application program, the one or more resources being selected from the group consisting of CPU time, total memory, and memory allocation rate.

88. The RTVM method of claim 87 wherein the configure method is selected.

89. The RTVM method of claim 88 wherein the quantification pertains to the allocation of CPU time.

90. The RTVM method of claim 88 wherein the quantification pertains to the allocation of total memory.

91. The RTVM method of claim 88 wherein the quantification pertains to the allocation of memory allocation rate.

92. The RTVM method of claim 87 wherein the negotiate method is selected.

93. The RTVM of claim 92 wherein the negotiation pertains to the allocation of CPU time.

94. The RTVM method of claim 92 wherein the negotiation pertains to the allocation of total memory.

95. The RTVM method of claim 92 wherein the negotiation pertains to the allocation of memory allocation rate.

96. The RTPM of claim 87 further comprising:
executing a timed-statement with a control structure consisting of (1) a keyword identifying the structure, (2) a specified increment of time, and (3) a specified code segment, it being anticipated that the specified code segment will execute within the specified increment of time, execution otherwise being aborted.

97. The RTVM method of claim 87 further comprising:
executing a preemptible-timed-statement with a control structure consisting of (1) a keyword identifying the structure, (2) a specified increment of time, and (3) a specified code segment, it being anticipated that the specified code segment will execute during a plurality of time slices within an execution period, the plurality of time slices adding up to the specified increment of time, execution otherwise being aborted.

98. The RTVM method of claim 87 further comprising:
executing an aperiodic-timed-statement with a control structure consisting of (1) a keyword identifying the structure, (2) a specified increment of time, and (3) a specified code segment, it being anticipated that the specified code segment will execute in time segments spread over a plurality of execution periods, the time segments in the plurality of execution periods adding up to the specified increment of time, execution otherwise being aborted.

99. The RTVM method of claim 87 further comprising:
executing an atomic-statement with a control structure consisting of (1) a keyword identifying the structure and (2) a specified code segment, the specified code segment being execution-time analyzable, the control structure requiring that either enough time be assigned to execute the specified code segment or that none be assigned.

100. The RTVM method of claim 87 wherein real-time tasks include periodic, sporadic, ongoing, and spontaneous real-time tasks, the method of execution of a real-time task comprising a startup( ) method, a work( ) method, and a finish( ) method, the startup( ) and finish( ) methods being execution-time analyzable, the startup( ), work( ), and finish( ) methods being invoked in sequence each time a periodic, sporadic, or spontaneous task is executed, the startup( ) method being invoked exactly once for an ongoing task following which the work( ) method is invoked and suspended repeatedly, the finish( ) method for the ongoing task being invoked only when the corresponding real-time activity terminates.

101. The RTVM method of claim 87 further comprising:
utilizing a real-time executive object to provide services in response to requests by the application code, the services being intended to provide information relating to the real-time activities.

102. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
long analyzeWCET(String methodName) which returns the worst-case time required to execute the specified method.

103. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
long analyzeEET(String methodName) which returns the expected time required to execute the specified method.

104. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
int codeSize(Object o) which returns the worst-case number of bytes required to represent the object o's instruction and static memory data.

105. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
int dataSize(Object o) which returns the worst-case number of bytes required to represent the data belonging to object o.

106. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
void interpret(String methodName) which provides a suggestion to an underlying run-time system that this method should not be translated to native code but should instead be interpreted each time it is executed.

107. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
int persistentCodeSize(Persistent o) which returns the worst-case number of bytes of non-volatile memory required to represent the object o's instruction and static memory data.

108. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
int persistentDataSize(Persistent o) which returns the worst-case number of bytes of non-volatile memory required to represent the data belonging to object o.

109. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
Object [ ] references(Object o) which returns an array of objects representing all of the memory directly referenced by object o.

110. The RTVM method of claim 101 further comprising:
utilizing a real-time executive object to provide services in response to requests by an application code, the services including providing data concerning the configuration of real-time activities for the purpose of facilitating analysis of execution times and memory requirements, the requests for service comprising:
void translate(String methodName) which provides a suggestion to an underlying run-time system that this method should be translated to native code rather than be interpreted each time it is executed.

111. The RTVM method of claim 101 further comprising:
utilizing a real-time executive object to provide services in response to requests by an application code, the services including providing data concerning time, the requests for service comprising:
long cpuTime( ) which reports the amount of CPU time in increments smaller than one microsecond that has been executed by the current thread.

112. The RTVM method of claim 101 further comprising:
utilizing a real-time executive object to provide services in response to requests by an application code, the services including providing data concerning time, the requests for service comprising:
void sleep(long increment) and void sleep(int increment) which put the currently executing thread to sleep for a time period specified in increments smaller than one microsecond.

113. The RTVM method of claim 101 further comprising:
utilizing a real-time executive object to provide services in response to requests by an application code, the services including providing data concerning time, the requests for service comprising:
  int timeAccuracy( ) which returns the resolution of the local time measuring device in increments smaller than one microsecond.

114. The RTVM method of claim 101 further comprising:
utilizing a real-time executive object to provide services in response to requests by an application code, the services including providing data concerning time, the requests for service comprising:
  long upTime( ) which returns the time period in increments smaller than one microsecond since system startup.

115. The RTVM method of claim 101 further comprising:
utilizing a real-time executive object to provide services in response to requests by an application code, the services including negotiating CPU time and memory resources, the requests for service comprising:
  boolean addActivity(Activity a) which requests that a new real-time activity be added to an existing workload of activities, the request automatically invoking the configure( ) method for the new activity, the configure( ) method returning a representation of the activity's resource needs and wants, the request then invoking the negotiate( ) method for this and other currently executing activities in order to arrange a mutually agreeable allocation of resources.

116. The RTVM method of claim 101 further comprising:
utilizing a real-time executive object to provide services in response to requests by an application code, the services including negotiating CPU time and memory resources, the requests for service comprising:
  boolean addBiasedActivity(Activity a, float importance, float timeSpaceRatio) which requests that a new real-time activity be added to an existing workload of activities, the new activity being accorded preferential treatment, the request automatically invoking the configure( ) method for the new activity, the configure( ) method returning a representation of the activity's resource needs and wants, the request then invoking the negotiate( ) method for this and other currently executing activities in order to arrange a mutually agreeable allocation of resources.

117. The RTVM method of claim 101 further comprising:
utilizing a real-time executive object to provide services in response to requests by an application code, the services including negotiating CPU time and memory resources, the requests for service comprising:
  void removeActivity(Activity a) which removes an existing real-time activity from the current workload.

118. The RTVM method of claim 117 wherein all requests to kill existing real-time tasks are directed to the real-time executive by invoking the removeActivity( ) method.

119. The RTVM method of claim 101 further comprising:
utilizing a real-time executive object to provide services to an application code, the services including negotiating CPU time and memory resources, the requests for service comprising:
  void renegotiate(Activity a, ActivityResource p) which modifies the resource request of real-time activity as specified by p.

120. The RTVM method of claim 101 further comprising:
utilizing a real-time executive object to provide services in response to requests by an application code, the services including negotiating CPU time and memory resources, the requests for service comprising:
  boolean scheduleSpontaneous(Activity a, ActivityResource r, long maxReleaseTime) and boolean scheduleSpontaneous(Activity a, ActivityResource r, int maxReleaseTime) which schedules spontaneous tasks for one-time execution with release sometime between the present and maxReleaseTime with individual task deadlines as described by argument r, a representing a collection of spontaneous tasks and r representing their collective resource requirements.

121. The RTVM method of claim 101 further comprising:
utilizing a real-time executive object to provide services in response to requests by an application code, the services including run-time support for atomic segments, an atomic segment being executed either in its entirety or not at all, the method of execution of a real-time task comprising a startup( ) method, a work( ) method, and a finish( ) method, the currently executing thread being a supervisor for a real-time task, the requests for service comprising:
  void enterAtomic(Object o, AtomicSegmentId asi, int executionTime) and void enterAtomic(Object o, AtomicSegmentId asi, long executionTime) which, if the virtual machine is a multiprocessor system, places the specified task on a wait queue associated with object o's lock if some other task is currently locking access to object o, the specified task remaining on the wait queue until access is granted or until the specified task's current time slice expires, the specified task being suspended if the time slice expires first and enterAtomico restarted if and when the specified task is resumed, the term "suspended" meaning that (1) the specified task is put to sleep until its next scheduled execution time slot if the specified task is an ongoing task, (2) the specified task is put to sleep until its next scheduled time slice if the specified task is a periodic, sporadic or spontaneous task, and it is scheduled to receive additional time slices within its current period, and (3) the execution of the work( ) method for the specified task is aborted and the real-time executive invokes the specified task's finish( ) method if the specified task is a periodic, sporadic, or spontaneous task and it is not scheduled to receive additional time slices within its current period.

122. The RTVM method of claim 101 further comprising:
utilizing a real-time executive object to provide services in response to requests by an application code, the services including run-time support for atomic segments, an atomic segment being executed either in its entirety or not at all, the method of execution of a real-time task comprising a startup( ) method, a work( ) method, and a finish( ) method, the currently executing thread being a supervisor for a real-time task, the requests for service comprising:
  void enterAtomic(Object o, AtomicSegmentId asi, int executionTime) and void enterAtomic(Object o, AtomicSegmentId asi, long executionTime) which suspends the specified task if there is insufficient time in the current time slice to execute the complete atomic statement, the term "suspended" meaning that (1) the specified task is put to sleep until its next scheduled execution time slot if the specified task is an ongoing task, (2) the specified task is put to sleep until its next scheduled time slice if the specified task is a periodic, sporadic or spontaneous task, and it is scheduled to receive additional time slices within its current period, and (3) the execution of the work( ) method for the specified task is aborted and the real-time executive invokes the specified task's finish( ) method if the specified task is a periodic, sporadic, or spontaneous task and it is not scheduled to receive additional time slices within its current period.

123. The RTVM method of claim 101 further comprising:
utilizing a real-time executive object to provide services in response to requests by an application code, the services including run-time support for atomic segments, an atomic segment being executed either in its entirety or not at all, the requests for service comprising:
void enterAtomic(Object o, AtomicSegmentId asi, int executionTime) and void enterAtomic(Object o, AtomicSegmentId asi, long executionTime) which sets the value of asi to represent the specified atomic segment and sets appropriate flags within the real-time executive to prohibit other tasks from executing atomic statements that belong to object o if the virtual machine is a multiprocessor system.

124. The RTVM method of claim 101 further comprising:
utilizing a real-time executive object to provide services in response to requests by an application code, the services including run-time support for atomic segments, an atomic segment being executed either in its entirety or not at all, the currently executing thread being a supervisor for a real-time task, the requests for service comprising:
void exitAtomic(AtomicSegmentId asi) indicating that the currently executing thread is now leaving the atomic region identified by asi, the request releasing the mutual exclusion constraint on the specified object o that is identified by asi thereby permitting other tasks access to o's atomic segments.

125. The RTVM method of claim 101 further comprising:
utilizing a real-time executive object to provide services in response to requests by an application code, the services including run-time support for timed statements, a timed statement being a statement that is bounded in execution time, the requests for service comprising:
boolean alarmSet(Alarmid a) which returns true if and only if the alarm represented by argument a has been initialized, the request otherwise returning false;
void clearAlarm(Alarmid a) which removes the specified alarm a from the timeout queue if the corresponding alarm is set.

126. The RTVM method of claim 101 further comprising:
utilizing a real-time executive object to provide services in response to requests by an application code, the services including run-time support for timed statements, a timed statement being a statement that is bounded in execution time, the currently executing thread being a supervisor for a periodic real-time task, the requests for service comprising:
private void relinquish( ) which suspends the supervisor until the next time that it is appropriate to trigger its execution.

127. The RTVM method of claim 101 further comprising:
utilizing a real-time executive object to provide services in response to requests by an application code, the services including run-time support for timed statements, a timed statement being a statement that is bounded in execution time, the requests for service comprising:
void skewClock(long tinc) which adjusts pending alarm times by tinc time increments.

128. The RTVM method of claim 127 wherein all exception handlers and finally clauses in a virtual machine source code that are executed by real-time threads are execution-time analyzable, the RTVM constructing a call graph for each real-time thread, the RTVM method further comprising:
a byte code analysis method which utilizes the call graph for a real-time thread to identify all of the methods that might be invoked by the real-time thread, the byte code analysis method further comprising:
identifying all of the exception handlers and finally clauses within each of the identified methods;
determining the worst-case execution time for each exception handler and for each finally clause;
inserting an invocation of the real-time executive's skewClock( ) method at each entry into the body of a try statement for the purpose of instructing the real-time executive to abort the execution time at time X–T rather than X where T is the maximum time required to execute one of the try statement's exception handlers added to the time required to execute the try statement's finally clause;
inserting an invocation of the real-time executive's skewClock( ) method at the end of the try statement's body to restore the timeout clock to its original value.

129. The RTVM method of claim 101 further comprising:
utilizing a real-time executive object to provide services in response to requests by an application code, the services including run-time support for timed statements, a timed statement being a statement that is bounded in execution time, the method of execution of a real-time task comprising a startup( ) method, a work( ) method, and a finish( ) method, the requests for service comprising:
void startTimed(int timeLimit, Alarmidentity alarmid) and void startTimed(long timeLimit, Alarmidentity alarmid) which causes the real-time executive to suspend the thread if there is insufficient time in the current time slice to execute the complete timed statement, the term "suspended" meaning that (1) the specified task is put to sleep until its next scheduled execution time slot if the specified task is an ongoing task, (2) the specified task is put to sleep until its next scheduled time slice if the specified task is a periodic, sporadic, or spontaneous task, and it is scheduled to receive additional time slices within its current period, and (3) the execution of the work( ) method for the specified task is aborted and the real-time executive invokes the specified task's finish( ) method if the specified task is a periodic, sporadic, or spontaneous task and it is not scheduled to receive additional time slices within its current period.

130. The RTVM method of claim 101 further comprising:
utilizing a real-time executive object to provide services in response to requests by an application code, the services including run-time support for timed statements, a timed statement being a statement that is bounded in execution time, the requests for service comprising:

void startTimed(int timeLimit, Alarmidentity alarmid) and void startTimed(long timeLimit, Alarmidentity alarmid) which causes the real-time executive to set an alarm which is scheduled to expire in (timeLimit—B CPU-time-increments), B representing the worst-case time required by the task's exception handlers to respond to the timeout exception added to the maximum time spent within the implementation of startTimed( ) between the time at which a first condition is satisfied and the time at which the alarm is set, the first condition being that there is sufficient time in the current time slice to execute the complete timed statement, the alarmID object being updated to reflect the identity of the set alarm at the same time the alarm is set, the real-time executive sending a ThreadDeath exception to this task at the specified alarm time.

131. The RTVM method of claim 101 further comprising:
utilizing a real-time executive object to provide services in response to requests by an application code, the services including run-time support for timed statements, a timed statement being a statement that is bounded in execution time, the method of execution of a real-time task comprising a startup( ) method, a work( ) method, and a finish( ) method, the requests for service comprising:
void startTimedPreemptible(int timeLimit, Alarmidentity alarmid) and void startTimedPreemptible(long timeLimit, Alarmidentity alarmid) which cause the real-time executive to suspend the thread if there is insufficient time in the current time slice to execute the complete timed statement, the specified task being put to sleep until its next scheduled execution time slot if the specified task is an ongoing task, the real-time executive aborting execution of the work( ) method and invoking the specified task's finish( ) method if the specified task is a periodic, sporadic, or spontaneous task.

132. The RTVM method of claim 101 further comprising:
utilizing a real-time executive object to provide services in response to requests by an application code, the services including run-time support for timed statements, a timed statement being a statement that is bounded in execution time, the requests for service comprising:
void startTimedPreemptible(int timeLimit, Alarmidentity alarmid) and void startTimedPreemptible(long timeLimit, Alarmidentity alarmid) which cause the real-time executive to set an alarm which is scheduled to expire in (timeLimit—B CPU-time-increments), B representing the worst-case time required by the task's exception handlers to respond to the timeout exception added to the maximum time spent within the implementation of startTimedPreemptible( ) between the time at which a first condition is satisfied and the time at which the alarm is set, the first condition being that there is sufficient time in the current time slice to execute the complete timed statement, the alarmID object being updated to reflect the identity of the set alarm at the same time the alarm is set, the real-time executive sending a ThreadDeath exception to this task at the specified alarm time.

133. The RTVM method of claim 101 further comprising:
utilizing a real-time executive object to provide services in response to requests by an application code, the services including run-time support for timed statements, a timed statement being a statement that is bounded in execution time, the method of execution of a real-time task comprising a startup( ) method, a work( ) method, and a finish( ) method, the requests for service comprising:
void startTimedAperiodic(int timeLimit, Alarmidentity alarmid) and void startTimedAperiodic(long timeLimit, Alarmidentity alarmid) which prepares for execution of a timed aperiodic statement of duration specified by timeLimit, the real-time executive setting an alarm which is scheduled to expire in (timeLimit—B CPU-time-increments), B representing the worst-case time required by the task's exception handlers to respond to the timeout exception added to the maximum time spent within the implementation of startTimed( ) between the time at which a first condition is satisfied and the time at which the alarm is set, the first condition being that the currently executing task is an ongoing task, the real-time executive aborting the execution of the work( ) method and invoking the task's finish( ) method if the currently executing task is not an ongoing task, the alarmID object being updated to reflect the identity of the alarm at the same time the alarm is set, the real-time executive sending a ThreadDeath exception to this task when the alarm time arrives.

134. The RTVM method of claim 101 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
int allocatableBytes( ) which returns the number of bytes of volatile memory that the currently executing activity has permission to allocate, the request returning a special code if the real-time executive is not able to track the memory usage of activities, each activity's budget being increased as memory is reclaimed by the garbage collector and being decreased as the tasks that comprise the activity allocate memory.

135. The RTVM method of claim 101 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
int allocatablePersistentBytes( ) which returns the number of bytes of non-volatile memory that the currently executing activity has permission to allocate, the request returning a special code if the real-time executive is not able to track the persistent memory usage of activities, each activity's budget being increased as persistent memory is reclaimed by the garbage collector and being decreased as the tasks that comprise the activity allocate persistent memory.

136. The RTVM method of claim 101 further comprising:
utilizing a real-time executive object to provide services in response to requests by an application code, the services including run-time support for dynamic memory management, budgets for each activity's allocation of volatile and non-volatile memory being enforced by the real-time executive, the requests for service comprising:
  void doGC(int memSize, int persistentSize) causes the real-time executive to perform garbage collection during what was to have been the task's CPU-time slice until there is enough allocatable memory for the given activity to allow a single object of memSize bytes or a single persistent object of persistentSize bytes to be allocated, the task being suspended until its next scheduled execution if the time slice expires before the requested memory has been obtained.

137. The RTVM method of claim 101 further comprising: utilizing a real-time executive object to provide services in response to requests by an application code, the services including run-time support for dynamic memory management, budgets for each activity's allocation of volatile and non-volatile memory being enforced by the real-time executive, the requests for service comprising:
  void enableMemAllocExceptions( ) informs the real-time executive that a task prefers to receive an OutOfMemoryError exception whenever one of its memory allocation requests cannot immediately be satisfied.

138. The RTVM method of claim 101 further comprising: utilizing a real-time executive object to provide services in response to requests by an application code, the services including run-time support for dynamic memory management, budgets for each activity's allocation of volatile and non-volatile memory being enforced by the real-time executive, the requests for service comprising:
  int largestAllocatable( ) returns the size of the largest contiguous block of memory that the virtual machine promises to be able to allocate at the current time.

139. The RTVM method of claim 101 further comprising: utilizing a real-time executive object to provide services in response to requests by an application code, the services including run-time support for dynamic memory management, budgets for each activity's allocation of volatile and non-volatile memory being enforced by the real-time executive, the requests for service comprising:
  int largestPersistentAllocatable( ) returns the size of the largest contiguous block of persistent memory that the virtual machine promises to be able to allocate at the current time.

140. The RTVM method of claim 101 further comprising: utilizing a real-time executive object to provide services in response to requests by an application code, the services including run-time support for dynamic memory management, budgets for each activity's allocation of volatile and non-volatile memory being enforced by the real-time executive, the requests for service comprising:
  void suppressMemAllocExceptions( ) informs the real-time executive that a task desires to automatically relinquish its scheduled execution time to the garbage collector whenever one of its allocation requests cannot be satisfied, the garbage collector being allowed to execute until such time as the task's time slot expires or until the garbage collector reclaims the memory required to satisfy the allocation request.

141. The RTVM method of claim 101 further comprising: utilizing a real-time executive object to provide services in response to requests by an application code, the services including run-time support for run-time scheduling, the real-time executive dispatching real-time tasks according to agreed-upon real-time schedules, a real-time scheduler waiting for a relinquish( ) invocation to terminate a task's time slot for periodic, sporadic, and spontaneous tasks, the real-time executive automatically suspending a task at the end of its allotted time slot after first waiting for ongoing execution of any atomic segments to be completed for ongoing tasks, an atomic segment being executed either in its entirety or not at all, the requests for service comprising:
  void triggerTask(TaskDescriptor taskid) throws FrequencyExcess, TaskNotReady causes the real-time executive to initiate execution of a sporadic task, taskid representing the task to be executed, the real-time executive releasing the task for execution at whatever priority was determined appropriate at resource negotiation time after first verifying that the specified task has not yet exceeded its previously negotiated execution frequency, the real-time executive throwing a FrequencyExcess exception if the task has already used up its execution frequency budget, FrequencyExcess being an exception that is thrown by the real-time executive's triggerTask( ) method whenever an attempt is made to invoke a sporadic task more frequently than was arranged at resource negotiation time, the triggerTask( ) method causes a specified task to be released for execution, the triggerTask( ) throwing a TaskNotReady exception if taskid equals null or represents a task that is not sporadic or belongs to an activity that is no longer running.

142. The RTVM method of claim 101 further comprising: utilizing a real-time executive object to provide services in response to requests by an application code, the services including the granting of requests for preferential treatment in allocating resources.

143. The RTVM method of claim 101 further comprising: utilizing a real-time executive object to provide services in response to requests by an application code, the services including the allocation of resources to activities in accordance with their importance.

144. The RTVM method of claim 101 wherein static objects are declared and initialized in the real-time executive object, the static objects including a defined constant used to represent ongoing tasks wherever the nature of a task must be distinguished by a single integer value, an object that can be thrown by a real-time activity needing to throw a timeout exception in order to avoid allocating a timeout object on the fly, and a defined constant used to represent periodic tasks wherever the nature of a task must be distinguished by a single integer value, a defined constant used to represent a spontaneous task wherever the nature of the task must be distinguished by a single integer value, and a defined constant used to represent a sporadic task wherever the nature of the task must be distinguished by a single integer value.

145. The RTVM method of claim 101 wherein the real-time executive maintains an internal representation of the most recently negotiated CPU workload and dispatches tasks at appropriate times in accordance with the most recently negotiated CPU workload.

146. The RTVM method of claim 145 wherein the real-time executive dispatches a task at the appropriate time and then trusts the task to invoke the real-time executive's relinquish method at the end of its allotted time slot when the task is a periodic, sporadic, or spontaneous task.

147. The RTVM method of claim 145 wherein the real-time executive dispatches a task at the beginning of its time slot and suspends the task at the end of its allotted time slot when the task is ongoing.

148. The RTVM method of claim 101 wherein a real-time activity loaded into a virtual machine configures itself by measuring its performance and then negotiating with the real-time executive to determine the levels of service quality that can be achieved, the currently executing application code instantiating the real-time activity into the virtual machine by invoking the real-time executive's addActivity( ) method, the real-time executive responding by invoking the real-time activity's configure( ) method, the real-time executive maintaining at least one ongoing real-time task for purposes of invoking the configure( ) methods of new activities.

149. The RTVM method of claim 101 wherein the real-time executive includes an interpret( ) method and a translate( ) method, the real-time executive invoking a real-time activity's configure( ) method when the real-time activity is added to the system workload, the configure( ) method invoking the real-time executive's interpret( ) method to suggest that certain methods be interpreted in a byte-code language understood by the RTVM, the configure( ) method invoking the real-time executive's translate( ) method to suggest that other methods be translated into the language of the RTVM execution platform, the default condition being to allow the run-time system to decide for itself whether to interpret or translate particular methods.

150. The RTVM method of claim 101 wherein the real-time executive includes an analyzeWCET( ) method and each real-time activity includes a configure method, the real-time executive invoking a real-time activity's configure( ) method when the real-time activity is added to the system workload, the configure( ) method invoking the real-time executive's analyzeWCET( ) method to determine the worst-case execution time of a method, analyzeWCET( ) returning a first special code if the code is not analyzable or a second special code if the local execution environment lacks the ability to analyze code, the results of the analysis being stored as part of the analyzed method's internal representation.

151. The RTVM method of claim 101 wherein the real-time executive includes an analyzeEET( ) method and each real-time activity includes a configure( ) method, the real-time executive invoking a real-time activity's configure( ) method when the real-time activity is added to the system workload, the configure( ) method invoking the real-time executive's analyzeEET( ) method to determine the expected execution time of a method, analyzeEET( ) returning a first special code if the code is not analyzable or a second special code if the local execution environment lacks the ability to analyze code, the results of the analysis being stored as part of the analyzed method's internal representation.

152. The RTVM method of claim 101 wherein the real-time executive includes a cpuTime( ) method and each real-time activity includes a configure( ) method, the real-time executive invoking a real-time activity's configure method when the real-time activity is added to the system workload, the configure( ) method invoking the real-time executive's cpuTime( ) method to measure typical execution times.

153. The RTVM method of claim 152 wherein the real-time executive includes a sleep( ) request for putting a currently executing thread to sleep for a specified time period, the configure( ) method inserting a real-time executive's sleep( ) request between each of a plurality of consecutive invocations of the method being measured in order to approximate execution-time cache contention.

154. The RTVM method of claim 101 wherein the real-time executive includes a dataSize( ) method and a persistentDataSize( ) method and each real-time activity includes a configure( ) method, the real-time executive invoking a real-time activity's configure( ) method when the real-time activity is added to the system workload, the configure( ) method invoking the real-time executive's dataSize( ) method and persistentDataSize( ) method to determine the amount of memory required to represent a particular object's data structures, the methods returning a special code if the local environment is unable to determine the memory used to represent the object's data structures.

155. The RTVM method of claim 101 wherein the real-time executive includes a codeSize( ) method and persistentCodeSize( ) method and each real-time activity includes a configure( ) method, the real-time executive invoking a real-time activity's configure( ) method when the real-time activity is added to the system workload, the configure( ) method invoking the real-time executive's codesize( ) method and persistentCodeSize( ) method to determine the amount of memory required to represent a particular object's instructions, the methods returning a special code if the local environment is unable to determine the memory used to represent the object's instructions.

156. The RTVM method of claim 101 wherein each real-time activity includes a configure( ) method, a negotiate( ) method, and a commit( ) method, the real-time executive invoking a real-time activity's configure( ) method when the real-time activity is added to the system workload, the real-time activity responding with a representation of the activity's resource needs and wants, the real-time executive invoking the negotiate( ) method and proposing a budget, the real-time activity responding with "agree" or a proposed budget revision followed by "disagree", the real-time executive having the option of invoking the commit() method in the real-time activity if the response was "agree".

157. The RTVM method of claim 156 wherein the proposing-a-budget step allows the real-time executive to propose alternative budgets if particular activities respond with "disagree".

158. The RTVM method of claim 101 wherein the real-time executive constructs an activity supervisor object to represent a newly negotiated resource budget for a particular real-time activity, the activity supervisor object maintaining an array of task supervisor objects with one entry for each of the real-time tasks that comprise the real-time activity.

159. The RTVM method of claim 158 wherein the real-time executive creates a task supervisor thread to oversee execution of each real-time task, a task supervisor thread being an instance of a task supervisor class.

160. The RTVM method of claim 159 wherein the real-time executive creates a periodic task supervisor thread to oversee execution of a periodic, spontaneous, or sporadic task, a periodic task supervisor thread being an instance of a periodic task supervisor class, the periodic task supervisor class being a subclass of the task supervisor class.

161. The RTVM method of claim 159 wherein the real-time executive creates a thread supervisor object to oversee execution of an ongoing task, a thread supervisor object being an instance of a thread supervisor class, the thread supervisor class being a subclass of the task supervisor class.

162. The RTVM method of claim 101 wherein each real-time activity includes a configure( ) method and a negotiate( ) method, invoking the configure( ) method causing the real-time activity to allocate and initialize an activity resource object to represent the activity's CPU-time and memory needs, the real-time executive subsequently examining the resource requests of all real-time activities in the system and computing budgets for each real-time activity, the real-time executive creating a new activity resource object to represent the budget it is willing to grant to each real-time activity and passing this object as a parameter to the real-time activity's negotiate( ) method, the real-time activity then having an opportunity to accept or reject the proposed budget.

163. The RTVM method of claim 101 wherein the real-time executive includes an addActivity( ) method and a scheduleSpontaneous( ) method and each real-time activity includes a configure( ) method, spontaneous activities being in the real-time activities class, spontaneous activities comprising only spontaneous tasks, an application code creating an instance of a spontaneous activity in preparation for subsequent execution, the application code introducing the spontaneous activity to the real-time executive by invoking the addActivity( ) method, the addActivity( ) method refraining from scheduling the workload associated with the spontaneous activity, the real-time executive invoking the spontaneous activity's configure( ) method to enable the activity to analyze its memory and CPU-time requirements, the application code subsequently invoking the real-time executive's scheduleSpontaneous( ) method to request execution of the workload associated with the spontaneous activity.

164. The RTVM method of claim 101 further comprising:
utilizing a real-time executive object to provide services to an application code, the services including negotiating CPU time and memory resources, the requests for service comprising:
ActivityInventory getBiases( ) which returns an ActivityInventory object that represents all of the activities in the current workload along with the importance and timeSpaceRatio of each, importance being a measure of the importance of an activity, timeSpaceRatio expressing the desired ratio of the fractional scaleback in CPU time to the fractional scaleback in memory space.

165. The RTVM method of claim 164 wherein the PersistencyManager implements:
a bootstrap( ) method invoked soon after a virtual machine is restarted in order to reactivate all of the objects which have been stored in persistent memory, the bootstrap( ) method being automatically invoked when the PersistencyManager class is first loaded;
a createShadow(Persistent o) method invoked by the application code to request the PersistencyManager to create a non-volatile shadow copy of the object o;
a deleteShadow(Persistent o) method invoked by the application code to delete shadow object o;
an updateShadow(Persistent o) throws ReferenceNotPersistent method invoked by the application code to request that the modified object o be written to persistent memory, the method guaranteeing that if the virtual machine crashes during the execution of the method, the complete persistent copy of object o will either have its original values or its new values, the PersistencyManager ensuring that if multiple updateShadow( ) invocations appear within a single atomic segment, either all or none of the updateShadow( ) commands are considered to have completed if the system crashes during execution of the atomic segment, an atomic segment being executed either in its entirety or not at all.

166. The RTVM method of claim 101 further comprising:
utilizing a real-time executive object to provide services to an application code, the services including negotiating CPU time and memory resources, the requests for service comprising:
void biasWorkload(ActivityInventory newBias) which causes the importance and timeSpaceRatio entries for each of the activities that is in both the current workload and in newBias, importance being a measure of the importance of an activity, timeSpaceRatio expressing the desired ratio of the fractional scaleback in CPU time to the fractional scaleback in memory space.

167. The RTVM method of claim 166 wherein when power is restored to a virtual machine that contains persistent objects, the bootstrap( ) method comprises:
(a) making consistent those persistent objects that were in an inconsistent state at the time the virtual machine shut down;
(b) creating a heap-memory copy which will be shadowed by the persistent copy for each persistent object in persistent memory;
(c) introducing any of the objects created in (b) which are of type RealTime.Activity to the real-time executive by invoking the addActivity( ) method thereby causing the configuration of the real-time activity followed by negotiation for object resources;
(d) invoking the object's run( ) method for any of the heap objects created in (b) which are Runnable but were not involved in real-time activities.

168. The RTVM method of claim 101 further comprising:
utilizing a real-time executive object to provide services to an application code, the services including negotiating CPU time and memory resources, the requests for service comprising:
long systemCycleTime( ) which returns the number of time increments required to execute one period of the system's cyclic schedule, systemCycleTime( ) returning a special code if the system is not currently using a cyclic dispatch table.

169. The RTVM method of claim 87 further comprising:
utilizing a virtual machine code analysis method at the time of execution of a program to determine the worst-case execution time of a program fragment, a program fragment being represented as a control-flow graph, a program fragment being marked as to whether (1) it has not yet been analyzed, (2) it is currently being analyzed, (3) it has been shown to be unanalyzable, or (4) it has already been analyzed, the byte code analysis method comprising:
aborting the analysis if (2), (3), or (4) is true;
aborting the analysis and marking the fragment's status as (3) if any of the methods invoked within the loop are not final;
identifying all of the loops in the program fragment;
identifying a loop header and footer for each loop, the analysis being aborted and the fragment's status being marked as (3) if a header and footer cannot be found for each loop;
starting with the innermost nested loops and working outward:
identifying all basic induction variables;
identifying the set of constant-initiated induction variables contained in the set of basic induction variables, the analysis being aborted and the fragment's status being marked as (3) if the constant-initiated induction variables set is empty;

identifying the set of iteration-bound induction variables contained in the set of constant-initiated induction variables, the analysis being aborted and the fragment's status being marked as (3) if the iteration-bound induction variables set is empty;

identifying all of the decision points by which control may leave the loop;

identifying the set of obligatory decision points contained in the set of decision points, the analysis being aborted and the fragment's status being marked as (3) if the obligatory decision points set is empty;

identifying the set of obligatory decision points that are based on magnitude comparison of an iteration-bound induction variable with a constant, the analysis being aborted and the fragment's status being marked as (3) if the magnitude-comparison-based obligatory decision points set is empty;

determining the worst-case execution time from the bound for the maximum number of loop iterations given by the obligatory decision point that represents the tightest bound;

calculating the worst-case execution time of the non-iterative loop components as the maximum worst-case execution time for any path from the component's entry point to its exit point, carefully considering pipeline and cache effects.

170. The RTVM method of claim 87 wherein the stop( ) method is used to send a ThreadDeath exception to an executing thread when the alarm time is reached, it being arranged to catch this exception and respond appropriately rather than allowing the exception to abort the thread.

171. The RTVM method of claim 87 wherein run-time support is provided for the creation and maintenance of persistent objects, persistent objects being objects that continue to live even after the virtual machine has crashed and/or been restarted, a Persistent interface being defined which declares several fields for use by a PersistencyManager.

172. The RTVM method of claim 87 further comprising:
utilizing an activity resource object to represent the memory and CPU time needs of a real-time activity, the activity resource object being an instance of an activity resource class.

173. The RTVM method of claim 172 wherein an activity resource object maintains an array of task resource objects, memory being requested and budgeted for the real-time activity, CPU time being budgeted for the individual real-time tasks that comprise a real-time activity.

174. A method for translating a first programming language into a second programming language, the first programming language being an extended version of the second programming language, the first programming language including real-time code expressions for specifying real-time execution requirements, the method comprising:

translating the real-time code expressions whereby the execution of a second-language translation of a first-language application program complies with the real-time execution requirements on a best-effort basis.

175. The method of claim 174 wherein the first programming language does and the second programming language does not use a timed-statement control structure, the control structure consisting of (1) a keyword identifying the structure, (2) a specified increment of time, and (3) a specified code segment, it being anticipated that the specified code segment will execute within the specified increment of time, execution otherwise being aborted, the method further comprising:

translating the timed-statement control structure of the first programming language into a control structure of the second programming language.

176. The method of claim 174 wherein the first programming language does and the second programming language does not use a preemptible-timed-statement control structure, the control structure consisting of (1) a keyword identifying the structure, (2) a specified increment of time, and (3) a specified code segment, it being anticipated that the specified code segment will execute during a plurality of time slices within an execution period, the plurality of time slices adding up to the specified increment of time, execution otherwise being aborted, the method further comprising:

translating the preemptible-timed-statement control structure of the first programming language into a control structure of the second programming language.

177. The method of claim 174 wherein the first programming language does and the second programming language does not use an aperiodic-timed-statement control structure, the control structure consisting of (1) a keyword identifying the structure, (2) a specified increment of time, and (3) a specified code segment, it being anticipated that the specified code segment will execute in time segments spread over a plurality of execution periods, the time segments in the plurality of execution periods adding up to the specified increment of time, execution otherwise being aborted, the method further comprising:

translating the aperiodic-timed-statement control structure of the first programming language into a control structure of the second programming language.

178. The method of claim 174 wherein the first programming language does and the second programming language does not use an atomic-statement control structure, the control structure consisting of (1) a keyword identifying the structure and (2) a specified code segment, the specified code segment being execution-time analyzable, the control structure requiring that either enough time be assigned to execute the specified code segment or that none be assigned, the method further comprising:

translating the atomic-statement control structure of the first programming language into a control structure of the second programming language.

* * * * *

UNITED STATES PATENT AND TRADEMARK OFFICE
CERTIFICATE OF CORRECTION

PATENT NO.    : 6,438,573 B1
DATED         : August 20, 2002
INVENTOR(S)   : Kelvin D. Nilsen It is certified that error appears in the above-identified patent and that said Letters Patent is hereby corrected as shown below:

Column 50,
Line 34, "enterAtomico" should read -- enterAtomic() --.

Column 57,
Line 33, "configure" should read -- configure() --.
Line 60, "configure" should read -- configure() --.

Column 58,
Line 24, "codesize()" should read -- codeSize() --.

Signed and Sealed this

Eighteenth Day of February, 2003

JAMES E. ROGAN
*Director of the United States Patent and Trademark Office*